(12) United States Patent
Katsurahira et al.

(10) Patent No.: US 11,262,875 B2
(45) Date of Patent: *Mar. 1, 2022

(54) POSITION DETECTION DEVICE AND POSITION INDICATOR

(71) Applicant: Wacom Co., Ltd., Saitama (JP)

(72) Inventors: Yuji Katsurahira, Saitama (JP); Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/010,609

(22) Filed: Sep. 2, 2020

(65) Prior Publication Data

US 2020/0401244 A1    Dec. 24, 2020

Related U.S. Application Data

(63) Continuation of application No. 15/839,033, filed on Dec. 12, 2017, now Pat. No. 10,809,817, which is a
(Continued)

(30) Foreign Application Priority Data

Jun. 29, 2015    (JP) .............................. JP2015-130409

(51) Int. Cl.
*G06F 3/041*    (2006.01)
*G06F 3/044*    (2006.01)
(Continued)

(52) U.S. Cl.
CPC .............. *G06F 3/0442* (2019.05); *G06F 3/03* (2013.01); *G06F 3/0383* (2013.01);
(Continued)

(58) Field of Classification Search
CPC ........................................ G06F 3/03545–03546
See application file for complete search history.

(56) References Cited

U.S. PATENT DOCUMENTS

| 7,646,379 B1 | 1/2010 | Drennan et al. |
| 2007/0177533 A1 | 8/2007 | Palay et al. |

(Continued)

FOREIGN PATENT DOCUMENTS

| CN | 104679292 A | 6/2015 |
| EP | 3 098 695 A1 | 11/2016 |

(Continued)

OTHER PUBLICATIONS

International Search Report, dated Oct. 6, 2015, for International Application No. PCT/JP2015/071994, 2 pages.
(Continued)

*Primary Examiner* — Roy P Rabindranath
(74) *Attorney, Agent, or Firm* — Seed IP Law Group LLP

(57) ABSTRACT

An active stylus is provided, which can reduce battery power consumption and reduce the time required for its signal transmission. A position detection device includes a tablet and the stylus having a built-in power source, which are capable of bi-directional transmission and reception of signals through capacitive coupling therebetween. The tablet is configured to transmit a trigger signal US_trg and then transmit a command signal US_cmd to the stylus. The trigger signal US_trg causes the stylus to start its command information receiver to receive the command signal US_cmd including information for controlling the stylus.

24 Claims, 13 Drawing Sheets

Related U.S. Application Data continuation of application No. PCT/JP2015/071994, filed on Aug. 3, 2015.

(51) Int. Cl.
  *G06F 3/03* (2006.01)
  *G06F 3/0354* (2013.01)
  *G06F 3/038* (2013.01)

(52) U.S. Cl.
  CPC .......... *G06F 3/03545* (2013.01); *G06F 3/041* (2013.01); *G06F 3/044* (2013.01); *G06F 3/0416* (2013.01); *G06F 3/0446* (2019.05)

(56) References Cited

U.S. PATENT DOCUMENTS

| | | |
|---|---|---|
| 2011/0090146 A1 | 4/2011 | Katsurahira |
| 2012/0105362 A1 | 5/2012 | Kremin et al. |
| 2014/0078101 A1 | 3/2014 | Katsurahira |
| 2014/0118308 A1 | 5/2014 | Rhee |
| 2014/0168142 A1 | 6/2014 | Sasselli et al. |
| 2014/0176495 A1 | 6/2014 | Vlasov |
| 2014/0253422 A1 | 9/2014 | Tomizawa et al. |
| 2015/0002425 A1 | 1/2015 | Lee et al. |
| 2015/0062094 A1 | 3/2015 | Ryshtun et al. |
| 2015/0145836 A1 | 5/2015 | Katsurahira |
| 2016/0091919 A1 | 3/2016 | Takeda et al. |
| 2016/0110015 A1 | 4/2016 | Takaya et al. |
| 2016/0224135 A1 | 8/2016 | Kremin et al. |
| 2016/0364022 A1 | 12/2016 | Lin |
| 2017/0131798 A1 | 5/2017 | Geaghan et al. |
| 2018/0018028 A1 | 1/2018 | Lee et al. |

FOREIGN PATENT DOCUMENTS

| | | |
|---|---|---|
| JP | 2007-531938 A | 11/2007 |
| JP | 2012-022543 A | 2/2012 |
| JP | 2014-63249 A | 4/2014 |
| JP | 2014-86094 A | 5/2014 |
| JP | 2015-103143 A | 6/2015 |
| JP | 2015-114894 A | 6/2015 |
| KR | 10-2014-0043299 A | 4/2014 |
| KR | 10-2015-0003626 A | 1/2015 |
| WO | 2014/185523 A1 | 11/2014 |
| WO | 2014/192828 A1 | 12/2014 |
| WO | 2015/036999 A1 | 3/2015 |

OTHER PUBLICATIONS

South Korean Office Action, dated May 21, 2021, for South Korean Application No. 10-2018-7000640, 13 pages. (with English Translation).

Japanese Office Action, dated Dec. 7, 2021, for Japanese Application No. 2020-204774, 8 pages. (with English Translation).

European Search Report, dated Jan. 14, 2022, for EP 21 20 1610, 9 pages.

1(0×1AD3)　　　0(0×E54C)　　　1(0×1AD3)

POSITION DETECTION DEVICE AND POSITION INDICATOR

BACKGROUND

Technical Field

The present disclosure relates to a position detection device and a position indicator and, more particularly, to a position detection device that obtains a position pointed to by a position indicator on a tablet through capacitive coupling between the tablet and the position indicator, which is of a type having a built-in power source, and to such position indicator.

Description of the Related Art

There is known a position detection device including a tablet and an active stylus (simply referred to as "stylus" hereinafter), which is a position indicator of a built-in power source type, wherein the tablet and the stylus are coupled through capacitive coupling for signal transmission. This type of position detection device is configured such that the stylus transmits signals and the tablet receives the signals in a one-way communication. An example of the position detection device of this type is disclosed in Patent Document 1.

Another example of the position detection device is disclosed in Patent Document 2. This position detection device is constructed as follows. A stylus is provided with an electrode and a battery for signal transmission, and the stylus detects a pen pressure and transmits the pen pressure detection result in digital signals. A tablet is composed of a display unit and a transparent sensor, and the transparent sensor permits detection of the position pointed to by the stylus and the pen pressure as well as the position touched by a finger.

PRIOR ART DOCUMENT

Patent Documents

Patent Document 1: PCT Patent Publication No. 2014/051296
Patent Document 2: Japanese Patent Laid-open No. 2014-63249
Patent Document 3: Japanese Patent Laid-open No. 2015-103143

BRIEF SUMMARY

Technical Problem

The position detection device disclosed in Patent Document 1 has a disadvantage as described below. The conventional stylus has an unique IDentification data (unique IDentification (ID)) stored therein, and is so constructed as to transmit the unique ID together with other signals to the tablet. The unique ID is a piece of data that may be larger than 60 bits, as disclosed in Patent Document 1, and thus the unique ID may require a long time for transmission.

The conventional position detection device containing the stylus is designed for one-way transmission from the stylus to the tablet, which requires the stylus to continue transmitting signals even when it is not on the tablet. Due to such continuous transmission of signals, the conventional stylus suffers from excessive battery consumption.

Moreover, the unique ID described above is information which needs not be transmitted repeatedly from the position indicator, once the tablet recognizes the position indicator, while the stylus remains on the tablet. The conventional stylus disclosed in Patent Document 1 transmits the unique ID repeatedly, which causes the position indicator to take a long time for signal transmission. This also leads to further battery consumption.

Thus, it is an aspect of the present disclosure to provide a position detection device and a position indicator, wherein the position detection device is characterized in that a stylus (which is a position indicator with a built-in power source) reduces battery consumption and reduces the time required for signal transmission.

Technical Solution

A position detection device according to the present disclosure is configured to obtain a pointed position on a tablet by a position indicator through capacitive coupling between the tablet and the position indicator. The position detection device has the basic construction as explained in the following.

The tablet transmits to the position indicator a first control signal and a second control signal, which are different from each other in terms of frequencies or modulation methods, to control the position indicator. The position indicator has a power source and transmits at least a position indicating signal to the tablet. The position indicator includes a first control signal receiver that receives the first control signal and a second control signal receiver that receives the second control signal, respectively. (Basic structure 1)

In the position detection device characterized by the basic structure 1, the first control signal may have a single frequency and not modulated, and the second control signal may be modulated with binary data. (Basic structure 2)

In the position detection device characterized by the basic structure 2, the position indicator may operate in a first operation mode which only receives the first control signal, and in a second operation mode which transmits at least the position indicating signal and receives the second control signal repeatedly. The position indicator in the first operation mode, once receiving the first control signal, transitions from the first operation mode to the second operation mode. (Basic structure 3)

In the position detection device characterized by the basic structure 3, the position indicator may include unique ID information or include a pen pressure detection circuit, and transmit a data signal modulated according to the unique ID information or pressure information detected by the pen pressure detection circuit. The position indicator may be configured to select, based on the second control signal received, one of the unique ID information, the pen pressure information, and other information, according to which to modulate a data signal to be transmitted. (Basic structure 4)

A position indicator according to another aspect of the present disclosure obtains a pointed position on a tablet through capacitive coupling between the position indicator and the tablet. The position indicator generates a transmitting signal by resonance generated by a resonance circuit including a transformer primary coil and a capacitor. The position indicator also includes a control signal receiving circuit connected to a transformer secondary coil, to which an electrode is connected. The control signal is transmitted from the tablet with a frequency close to a resonant frequency of the resonance circuit.

Advantageous Effect

The position detection device according to the present disclosure is characterized as follows. The tablet transmits to the position indicator the first control signal having a single frequency and the second control signal which has been modulated with binary data. The position indicator, when not on the tablet, does not transmit the position indicating signal nor receive the second control signal, which would require large power consumption; rather, it only receives the first control signal with minimum power consumption. Thus, the position indicator can suppress excessive power consumption.

Further, the position indicator can adjust what information is to be transmitted as a digital signal, in response to the second control signal received. This eliminates the need for the position indicator to always transmit the unique ID together with the information of pen pressure. This permits the position indicator to reduce the time required for signal transmission, which leads to further power saving.

DETAILED DESCRIPTION

The preferred embodiments of the present disclosure will be described below in more detail with reference to the accompanying drawings.

Figure 1:
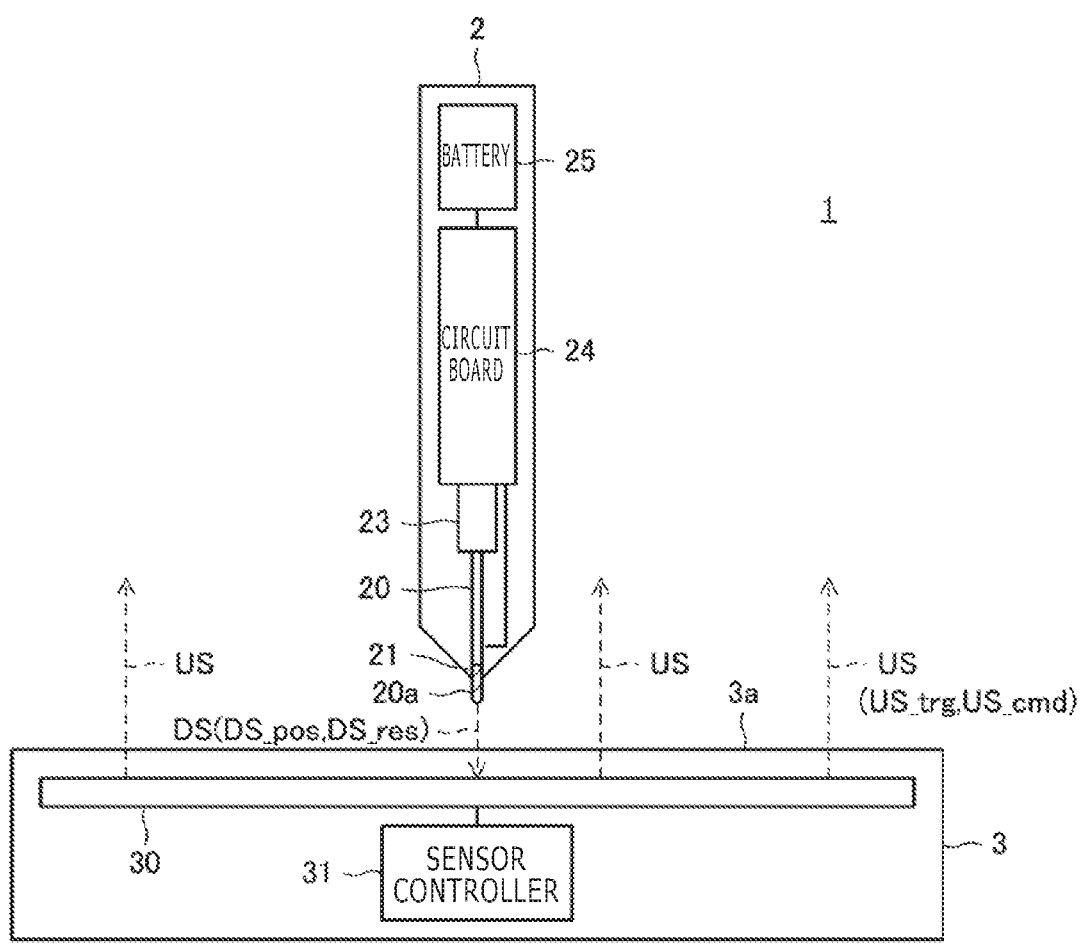
FIG. 1 is a diagram depicting the structure of a position detection device 1 according to a first embodiment of the present disclosure.
Figure 2:
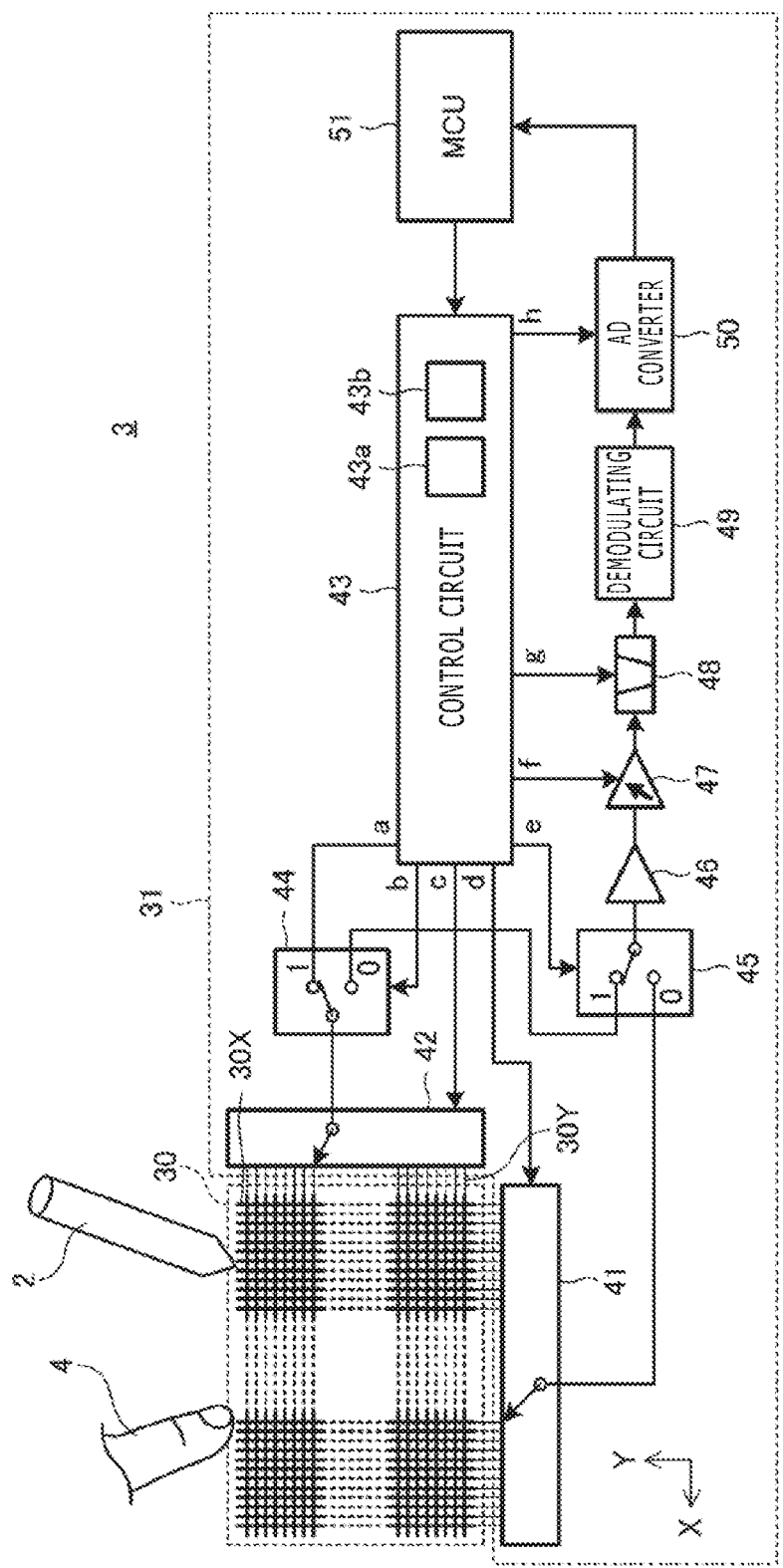
FIG. 2 is a diagram depicting the internal structure of a tablet 3 depicted in FIG. 1.
Figure 3:
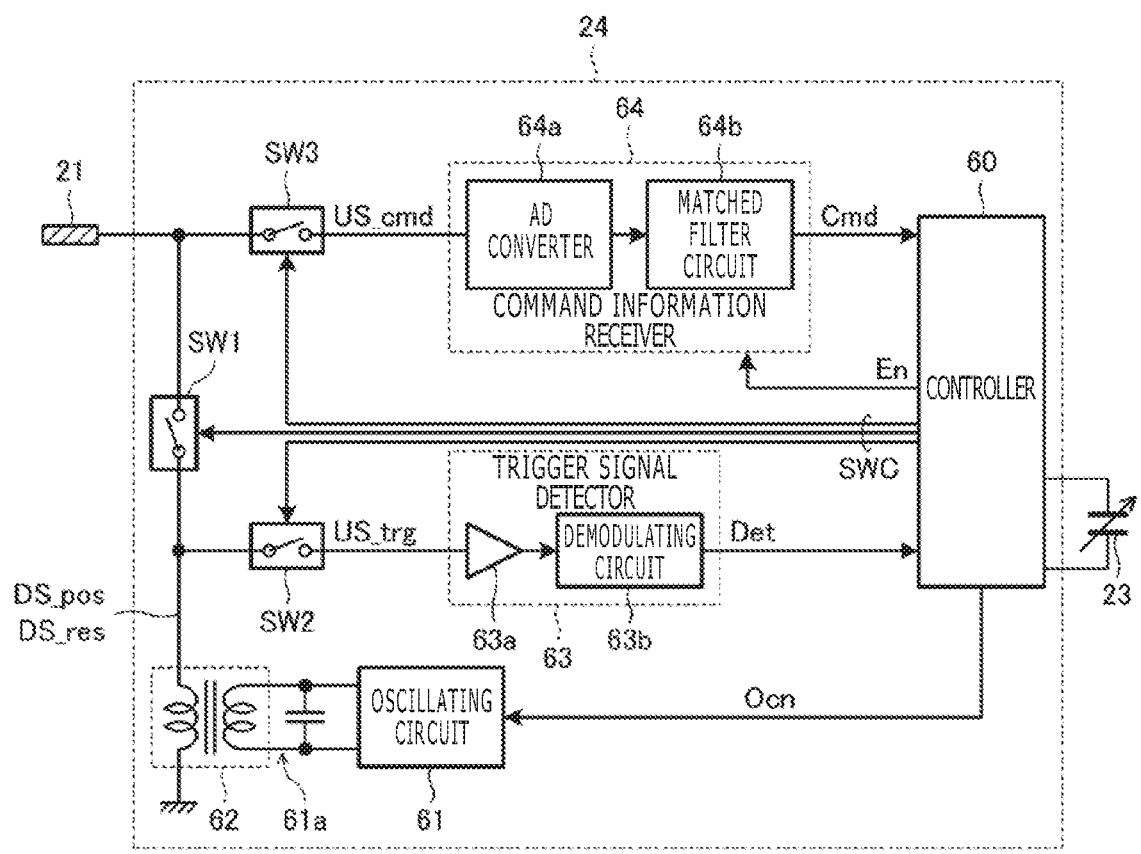
FIG. 3 is a diagram depicting the internal structure of a stylus 2 depicted in FIG. 1.

According to a first embodiment of the present disclosure, a position detection device 1 is configured as depicted in FIG. 1. It is noted from FIG. 1 that the position detection device 1 is composed of a stylus 2, which functions as a position indicator, and a tablet 3. The tablet 3 has the internal structure as depicted in FIG. 2. The stylus 2 has the internal structure as depicted in FIG. 3.

The stylus 2 is a device resembling a pen. As depicted in FIG. 1, it is composed of a core 20, an electrode 21, a pen pressure detecting sensor (a pen pressure detection circuit) 23, a circuit board 24, and a battery 25 (a power source).

The core 20 is a rod-like member, and is arranged such that the pen axis direction of the stylus 2 coincides with the lengthwise direction of the core 20. The core 20 has its tip 20a coated with a conductive material, which forms the electrode 21. The electrode 21 may be formed of a conductive material embedded in the core 20. The pen pressure detecting sensor 23 is physically connected to the core 20, to detect the pen pressure applied to the tip 20a of the core 20. The pen pressure detecting sensor 23 may use a capacitor, which varies its capacitance in response to the pen pressure, as described in Patent Document 2.

The electrode 21 is electrically connected to the circuit board 24, and detects control signals US (a trigger signal US_trg and a command signal US_cmd, as depicted in FIG. 1) transmitted from the tablet 3 and transmits stylus signals DS (a position signal DS_pos and a data signal DS_res, as depicted in FIG. 1) to the tablet 3. Alternatively, the electrode to receive the control signals US may be provided separately from the electrode to transmit the stylus signals DS.

The tablet 3 is composed of a flat sensor 30 and a sensor controller 31. The tablet 3 also includes a sensor surface 3a on the top of the sensor 30.

The tablet 3 has the internal structure as depicted in FIG. 2. The sensor 30 is composed of linear electrodes 30X and linear electrodes 30Y, which are extending in the X and Y directions respectively at equal intervals and which intersect with each other at right angles, thereby forming a matrix pattern. Though not illustrated, the sensor 30 includes a substrate of a transparent glass plate, and the linear electrodes 30X and 30Y are arranged on the back surface (an inside surface) of the transparent glass plate. The front surface (an outside surface) of the substrate forms the sensor surface 3a of the tablet 3. There may be an instance in which the tablet 3 is provided with the sensor surface 3a functioning as a display. In this case, the substrate is arranged on a display surface of the display device (not depicted) such as a liquid crystal display, and the linear electrodes 30X and 30Y are arranged between the liquid crystal display and the substrate, wherein the linear electrodes 30X and 30Y are preferably formed from a transparent conductor such as ITO (indium tin oxide).

The tablet 3 is constructed to detect not only the stylus 2 but also a human finger 4, as depicted in FIG. 2. Moreover, the tablet 3 is designed to perform two types of detection by time division because the detection system applicable to the stylus 2 differs from the detection system applicable to the finger 4, as will be more fully described below.

The sensor controller 31 is composed of a selecting circuit 41, a selecting circuit 42, a control circuit 43, switches 44 and 45, an amplifying circuit 46, a gain control circuit 47, a band-pass filter 48, a demodulating circuit 49, an analog-digital converter (AD converter) 50, and a memory controller (MCU) 51, as depicted in FIG. 2.

The selecting circuit 41 selects one or more adjoining ones of the linear electrodes 30X in response to a control signal d from the control circuit 43. Also, the selecting circuit 42 selects one or more adjoining ones of the linear electrodes 30Y in response to a control signal c from the control circuit 43.

The selecting circuit 41 and the selecting circuit 42 respectively select the X-electrode(s) and the Y-electrode(s), either of which is subsequently connected to the amplifying circuit 46 through the switch 45.

The amplifying circuit 46 amplifies the signal from the stylus 2, and the amplified signal has its gain controlled to a certain level by the gain control circuit 47. The gain-controlled signal enters the band-pass filter 48, which passes only that component which has the frequency of the signal transmitted from the stylus 2. The filtered signal is demodulated by the demodulating circuit 49. The demodulated signal passes through the analog-digital converter (AD converter) 50 and is converted into the output signal representing the level of the signal received from the stylus 2.

The switch 44 controls whether the Y-electrode(s) selected by the selecting circuit 42 should be used for signal reception or for signal transmission. The Y-electrode(s) selected by the selecting circuit 42 is connected to the amplifying circuit 46 through the switch 45 when a control signal b from the control circuit 43 is at a low level "0." The Y-electrode(s) selected by the selecting circuit 42 is supplied with a transmitting signal a from the control circuit 43 when the control signal b from the control circuit 43 is at a high level "1" and the transmitting signal a is transmitted from the sensor 30.

The tablet 3 has five operation modes, and the control circuit 43 may sequentially switch through the five modes to control respective circuits in the sensor controller 31, as will be described below. Each of the five operation modes will be described in detail.

The first mode is intended to detect the position of the finger 4. In this mode, the control circuit 43 assigns the control signal b to the high level "1" and assigns a control signal e to the low level "0." The Y-electrode selected by the selecting circuit 42 is supplied with the transmitting signal a from the control circuit 43, so that the sensor 30 transmits the touch detecting signal. On the other hand, the X-electrode selected by the selecting circuit 41 is connected to the amplifying circuit 46. At this time, the control circuit 43 carries out control in response to a control signal g such that the band-pass filter 48 produces the center frequency coinciding with the frequency of the touch detecting signal. According to this configuration, the MCU 51 senses a change in the touch detecting signal due to the finger 4 touching the sensor surface 3a, thereby deriving the coordinate position of the finger 4.

The second mode is intended to transmit the trigger signal US_trg (a first control signal; see FIG. 1) to the stylus 2. In this mode, the control circuit 43 assigns the control signal b to the high level "1" so that the Y-electrode selected by the selecting circuit 42 is supplied with the transmitting signal a from the control circuit 43 and the sensor 30 transmits the trigger signal US_trg. The transmitting signal a in this case is identical with the trigger signal US_trg, which is generated by the trigger signal transmitter 43a (a first control signal transmitter) that forms part of the control circuit 43. The transmitting signal a (the trigger signal US_trg) preferably has the same frequency as the signal transmitted by the stylus 2, as will be described later. Moreover, the trigger signal US_trg should preferably be a signal which is not modulated and has a single frequency.

In this case, the selecting circuit 42 may select an electrode from some of the electrodes 30Y that are close to the position pointed to by the stylus 2 to transmit the trigger signal US_trg from the selected electrode, or may select all of the electrodes 30Y at once to transmit the trigger signal US_trg from all of the electrodes.

The third mode is intended to transmit the command signal US_cmd (a second control signal; see FIG. 1) to the stylus 2. In this mode also, the control circuit 43 assigns the control signal b to the high level "1" so that the Y-electrode selected by the selecting circuit 42 is supplied with the transmitting signal a from the control circuit 43. The transmitting signal a in this case is identical with the command signal US_cmd, which is generated by the command signal transmitter 43b (a second control signal transmitter) that forms part of the control circuit 43. The transmitting signal a is a signal modulated according to the control information that controls the stylus 2 (command information Cmd, to be described later). The command signal US_cmd in this embodiment is a spectrum spread code.

Figure 13:
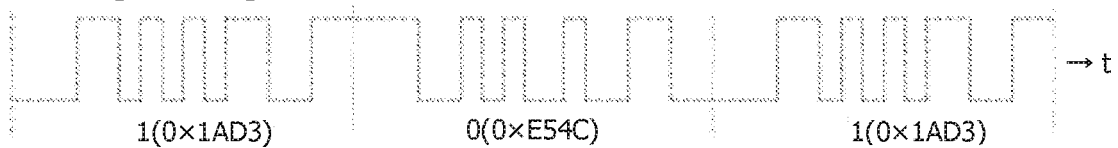
FIG. 13 is a diagram depicting an example of a command signal as the spectrum spread code.

The spectrum spread code as an example of the transmitting signal a is depicted in FIG. 13. In FIG. 13, transmission of 3-bit command information (1, 0, 1) is assumed, with the spread code being "0x1AD3." In other words, the output signal changes in the order of "0x1AD3" when the data being transmitted is "1," and the output signal changes in the order of "0xE54C," which is an inverse of "0x1AD3," when the data being transmitted is "0." It is assumed in FIG. 13 that transmission is performed sequentially from the upper bit of the spread code.

In this case also, the selecting circuit 42 may select an electrode from some of the electrodes 30Y that are close to the position pointed to by the stylus 2 to transmit the command signal US_cmd from the selected electrode, or may select all of the electrodes 30Y at once to transmit the command signal US_cmd from all of the electrodes.

The fourth mode is intended to detect the position signal DSpos transmitted from the stylus 2, thereby determining the position of the stylus 2. In this mode, the control circuit 43 assigns the control signal b to the low level "0" so that the Y-electrode selected by the selecting circuit 42 is connected to the amplifying circuit 46 through the switch 45. Also, the control circuit 43 transmits the control signal g to control the center frequency of the band-pass filter 48 to coincide with the frequency of the signal transmitted from the stylus 2.

According to this embodiment, when a coordinate of the stylus 2 on the X axis is to be obtained, the control circuit 43 assigns the control signal e to the low level "0" and connects the X-electrode selected by the selecting circuit 41 to the amplifying circuit 46. The MCU 51 reads the data output from the AD converter 50 as the signal level value while sequentially selecting a plurality, for example five, of X-electrodes selected by the selecting circuit 41, around the X-electrode closest to the position pointed to by the stylus 2. The MCU 51 determines the X-coordinate of the stylus 2 from the signal level distribution among the selected X-electrodes.

When a coordinate of the stylus on the Y axis is to be determined, the control circuit 43 assigns the control signal e to the high level "1" and connects the Y-electrode selected by the selecting circuit 42 to the amplifying circuit 46. The MCU 51 reads the data output from the AD converter 50 as the signal level value while sequentially selecting a plurality, for example five, of Y-electrodes selected by the selecting circuit 42, around the Y-electrode closest to the position pointed to by the stylus 2. The MCU 51 determines the Y-coordinate of the stylus 2 from the signal level distribution among the selected Y-electrodes.

The fifth mode is intended to receive the data signal DS_res (see FIG. 1) from the stylus 2. For reception of the data signal DS_res, either the X-electrode or the Y-electrode may be used. The following describes an instance in which the X-electrodes are used to receive the data signal DS_res. In this mode, the control circuit 43 assigns the control signal e to the low level "0" so that the X-electrode selected by the selecting circuit 41 is connected to the amplifying circuit 46. The control circuit 43 performs control according to the control signal g so that the center frequency of the band-pass filter 48 coincides with the frequency of the signal transmitted from the stylus 2. The control circuit 43 operates such that the selecting circuit 41 selects several, for example three, X-electrodes at once, which are around the X-electrode closest to the position pointed to by the stylus 2. The MCU 51 periodically reads the output from the AD converter 50.

In a case where the data signal DS_res is received by way of the Y-electrode, the control signal b should be assigned to the low level "0" and the control signal e should be assigned to the high level "1."

The foregoing has described how the control circuit 43 operates in each of the five modes. It should be understood from the foregoing description that the tablet 3 is so configured as to perform transmission and reception of signals by using the same sensor 30. The configuration of the tablet 3 depicted in FIG. 2 will be described in more detail below.

The amplifying circuit 46 amplifies the signal which is induced in any one of the electrodes 30X and 30Y selected by the selecting circuits 41 or 42. The gain control circuit 47 further amplifies the signal received from the amplifying circuit 46, such that it has its amount of amplification controlled by the control signal f from the control circuit 43. The gain control circuit 47 sends its output to the band-pass filter 48.

The band-pass filter 48 is a filter circuit which only allows passage of signals having a certain bandwidth around a defined center frequency. The center frequency is controlled by the control signal g received from the control circuit 43. In the mode of detecting the position of the finger 4 described above, the control circuit 43 controls the band-pass filter 48 such that the center frequency coincides with the frequency of the touch detecting signal. Moreover, in the mode of detecting the position of the stylus 2, the control circuit 43 controls the band-pass filter 48 such that the center frequency coincides with the frequency of the position signal DS_pos (see FIG. 1). In addition, in the mode of receiving the data signal DS_res (see FIG. 1), the control circuit 43 controls the band-pass filter 48 such that the center frequency coincides with the frequency of the data signal DS_res. It is assumed in this embodiment (depicted in FIG. 3) that the position signal DS_pos and the data signal DS_res have the same frequency.

The signal for finger detection and the signal for stylus detection (position signal DS_pos and data signal DS_res) preferably differ from each other in terms of their frequency bands. This configuration permits the band-pass filter 48 to discriminate between these signals. The data signal DS_res may be that of single frequency, or may contain more than one frequency component. In the latter case, it is desirable that the control circuit 43 controls the bandwidth of the band-pass filter 48 so that all of these frequencies are included.

The demodulating circuit 49 is a circuit which generates a voltage corresponding to the level of the output signal from the band-pass filter 48. The AD converter 50 performs analog-digital conversion at defined time intervals on the voltage corresponding to the level received from the demodulating circuit 49, thereby generating digital signals. The AD converter 50 controls the sampling time intervals in response to a control signal h from the control circuit 43. The AD converter 50 outputs the digital data to be read by the MCU 51.

The MCU 51 is a microprocessor including read-only memory (ROM) and random-access memory (RAM) and configured to operate according to a defined program. The MCU 51 controls the control circuit 43 to cause it to output the signals a to h. The MCU 51 also reads and processes the digital data from the AD converter 50.

The control circuit 43 is a logic circuit that outputs the signals a to h at timings specified by the instruction from the MCU 51.

Figure 16:
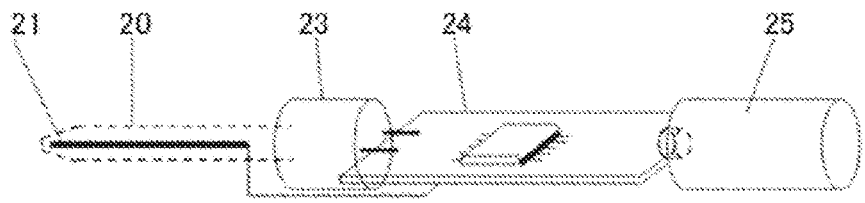
FIG. 16 is a diagram depicting an example of the internal structure of the stylus 2.

The foregoing is a description of the configuration and operation of the tablet 3. The following is a detailed description of the configuration and operation of the stylus 2. FIG. 16 is a diagram depicting an example of the internal structure of the stylus 2. FIG. 3 is a diagram depicting the internal structure of a stylus 2.

The circuit board 24 depicted in FIG. 3 includes three switches SW1 to SW3, a controller 60, an oscillating circuit 61, a transformer 62, a trigger signal detector 63, and a command information receiver 64.

The oscillating circuit 61 performs oscillation in accordance with an oscillation control signal Ocn supplied from the controller 60. The oscillating circuit 61 also includes an inductance-capacitance (LC) resonance circuit 61a composed of a coil and a capacitor.

The transformer 62 is composed of a primary coil (a first coil) and a secondary coil (a second coil), which are coupled with each other. The primary coil functions as a coil for the LC resonance circuit 61a. The secondary coil is connected to the electrode 21 through the switch SW1.

The trigger signal detector 63 is designed to receive the trigger signal US_trg from the tablet 3; that is, the trigger signal detector 63 is a first control signal receiver. The trigger signal detector 63 is composed of an amplifying circuit 63a and a demodulating circuit 63b. The amplifying circuit 63a is designed to amplify the trigger signal UStrg, which is induced in the electrode 21. The demodulating circuit 63b examines the output signal from the amplifying circuit 63a to see if it has a higher level than a defined level and then outputs it as a detected signal Det. The electrode 21 and the amplifying circuit 63a are connected to each other through the switches SW1 and SW2.

The level of the detected signal Det is high when the electrode 21 has received the trigger signal US_trg, and is low when the electrode 21 has not received the trigger signal US_trg. Thus, the trigger signal detector 63 can output the detected signal Det in a binary form based on the presence and absence of the trigger signal US_trg, without having to perform a specific decoding operation.

The trigger signal detector 63 receives the trigger signal US_trg while the input of the amplifying circuit 63a is connected to the transformer 62. Since the primary side of the transformer 62 forms the LC resonance circuit 61a, by making the trigger signal US_trg coincide with the resonance frequency of the LC resonance circuit 61a, one can achieve the trigger signal detector 63 that detects only the trigger signal US_trg from among signals induced in the electrode 21.

Figure 14:
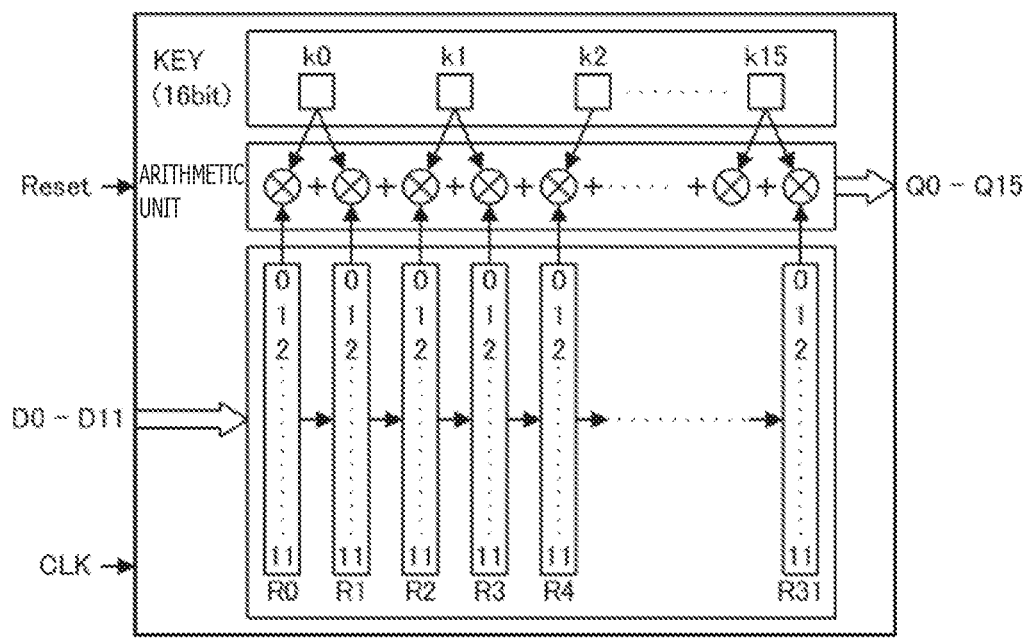
FIG. 14 is a diagram depicting an example of the structure of a matched filter circuit.

The command information receiver 64 receives the command signal US_cmd from the tablet 3; that is, the command information receiver 64 functions as a second control signal receiver. The command information receiver 64 is composed of an AD converter 64a and a matched filter circuit 64b. FIG. 14 is a diagram depicting an example of a structure of the matched filter circuit 64b. As illustrated in FIG. 14, the matched filter circuit is composed of a shift register (R0 to R31) that stores 12-bit data in 32 steps, a 16-bit register (K0 to K15) that stores a predetermined KEY code, and an arithmetic unit that performs arithmetic operation on the values stored in the shift registers and the KEY code. The arithmetic unit includes a 16-bit register (Q0 to Q15) that stores the results of operation.

The command information receiver 64 is connected to the electrode 21 through the switch SW3, so that it receives the command signal US_cmd when the switch SW3 is turned on and the switch SW1 is turned off. The operation of the command information receiver 64 will be described in more detail later. This type of circuit consumes a lot of electric power because it needs operation at a high clock rate. To address this issue, the embodiment described herein is designed such that the command information receiver 64 suspends its operation in response to the control signal En generated by the controller 60. Specifically, the command information receiver 64 is configured to operate when the control signal En is active (at a high level) and to become idle when the control signal En is inactive (at a low level). While being idle, the command information receiver 64 consumes very little power and does not receive the signal supplied to its input end. Because the controller 60 is so configured as to activate the control signal En in response to the trigger signal US_trg received prior to the command signal US_cmd, however, the stylus 2 can reliably receive the command signal US_cmd. This will be described in more detail later.

The controller 60 turns on and off the switches SW1 to SW3 in response to the control signal SWC, activates and inactivates the command information receiver 64 with the control signal En, generates the oscillation control signal Ocn, and allows the pen pressure detecting sensor 23 to detect a pen pressure. The controller 60 is formed of a microprocessor (MPU) that operates in accordance with a defined program. Each of the components will be described in more detail below.

In the present embodiment, the pen pressure detecting sensor 23 uses a capacitor which varies its capacitance in accordance with pen pressure. Pen pressure detection may be performed using the method disclosed in Patent Document 3, and its detailed description is omitted.

The controller 60 turns on and off the switches SW1 to SW3 and generates the control signal En as depicted in Table 1.

TABLE 1

| Timing | Corresponding mode for tablet 3 | SW1 | SW2 | SW3 | En | Action of stylus 2 |
|---|---|---|---|---|---|---|
| Initial state | Mode to detect position of finger 4 Mode to transmit trigger signal US_trg | on | on | off | Inactive | Reception of trigger signal US_trg |
| After reception of trigger signal US_trg | Mode to transmit command signal US_cmd | on | on/off | on | Active | Reception of command signal US_cmd |
| After reception of command signal US_cmd | Mode to detect position of stylus 2 | on | off | off | Inactive | Transmission of position signal DS_pos |
| After transmission of position signal DS_pos | Mode to receive data signal DS_res | on | off | off | Inactive | Transmission of data signal DS_res |

As shown in Table 1, the controller 60 in its initial state (when the stylus 2 is not placed on the tablet 3) keeps the switches SW1 and SW2 on and switch SW3 off so that the command information receiver 64 is in an operation-suspended state. Under this condition, the electrode 21 is connected to the trigger signal detector 63, and the trigger signal US_trg is received, as depicted in Table 1. The fact that the command information receiver 64 remains idle helps the stylus 2 to reduce power consumption.

After the trigger signal US_trg has been received, that is, after the detected signal Det has turned into a high level, the controller 60 turns the switch SW1 off and turns the switch SW3 on. Also, the control signal En is made active, so that the command information receiver 64 becomes operable. The switch SW2 may remain on or may be turned off. In this way, the electrode 21 is connected to the command information receiver 64 and the command information receiver 64 becomes active, so that the command signal US_cmd is received as depicted in Table 1. Thus, the command information receiver 64 receives the command signal US_cmd and then outputs the command information Cmd, which is temporarily stored in the controller 60.

Here, the controller 60 may select either the first operation mode or the second operation mode, with the former being intended for low-speed operation mode with low power consumption and the latter being intended for high-speed operation mode with high power consumption. The controller 60 in its low-speed operation mode can receive the detected signal Det (which is a simple binary signal), but cannot receive and process complex signals such as command information Cmd and cannot transmit the position signal DS_res and the data signal DS_pos. For these operations to be performed, the controller 60 should be turned into the high-speed operation mode. Therefore, the controller 60 illustrated in this embodiment should preferably be configured such that it autonomously transitions from the low-speed operation mode to the high-speed operation mode in response to the detected signal Det changing from the low level to the high level, that is, in response to the trigger signal US_trg being received. Preferably, the controller 60 may be configured such that it returns to the low-speed operation mode after the data signal DS_res has been transmitted. This way the controller 60 may minimize power consumption. The description continues on the assumption that the controller 60 is compatible with the two modes described above.

The controller 60 stores therein the command information Cmd received from the command information receiver 64 having received the command signal US_cmd, and then the controller 60 turns the switch SW1 on, the switch SW2 off, and the switch SW3 off. In addition, the controller 60 inactivates the control signal En so that the command information receiver 64 returns to its suspended state. Further, the controller 60 keeps the oscillation control signal Ocn at a high level for a certain period of time, so that the oscillating circuit 61 (a position indicating signal transmitter) becomes active. As a result, the electrode 21 generates the position signal DS_pos (a position indicating signal) and transmits it continuously for a certain period of time. During this transmission, the tablet 3 receives the position signal DS_pos, thereby determining the position pointed to by the stylus 2.

After having transmitted the position signal DS_pos, while the controller 60 keeps the switches SW1 to SW3 and the control signal En in the same state as before, the controller 60 generates the oscillation control signal Ocn and transmits it to the oscillating circuit 61, thereby causing the oscillating circuit 61 to generate the data signal DS_res in response to the command information Cmd stored in the controller 60. The apparatus configured as depicted in FIG. 3 generates the data signal DS_res, which is an OOK (On-Off Keying)-modulated signal. As a result of the foregoing operation, the controller 60 causes the electrode 21 to transmit the OOK-modulated data signal DS_res, which is received by the tablet 3 as described above. Thereafter, the controller 60 returns to the initial state.

The following description in reference to FIGS. 13 and 14 relates to how the command information receiver 64 extracts the command information Cmd from the command signal US_cmd. The matched filter circuit 64b (FIG. 14) receives the output (D0 to D11) and clock signal (CLK) from the AD converter 64a. The clock signal has the same frequency as the sampling frequency of the AD converter 64a, and preferably has a frequency which is an integer multiple of one step cycle of the spread code as depicted in FIG. 13. In the illustrate embodiment, the sampling frequency of the AD converter 64a is twice the step cycle of the spread code depicted in FIG. 13. Also, the controller 60 supplies the reset signal (Reset) (not depicted), which clears the values of the shift register (R0 to R31) and the values of the register (Q0 to Q15) of the arithmetic unit. The description of this embodiment is based on the assumption that the data (D0 to D11) from the AD converter 64a is captured at the leading edge of the clock signal (CLK) for the arithmetic unit to perform arithmetic operation.

The KEY code (k0 to k15) holds "0x1AD3" which is identical with the spread code of the command signal US_cmd (FIG. 13) transmitted from the tablet. That is, since this embodiment assumes that transmission starts from the higher-order bit, the KEY code takes the values of k0=1, k1=1, k2=0, k3=0, k4=1 . . . k15=0. The arithmetic unit calculates the total sum by addition or subtraction of each data stored in the shift register (R0 to R31), and outputs the result in terms of Q0 to Q15. This output (Q0 to Q15) represents the coded data. Here, since k0=1, each value of the shift register R0 and R1 is added to Q0 to Q15. Also, since k1=1, each value of the shift register R2 and R3 is added to Q0 to Q15. Since k2=0, each value of the shift register R4 and R5 is subtracted from Q0 to Q15. The thirty-two results of AD conversion (R0 to R31) undergo addition or subtraction, and are outputted as Q0 to Q15. The reason why processing is performed on two consecutive values of the shift register (R0 to R31) in response to each value of k0 to k15 is that the present embodiment is designed such that the sampling frequency of the AD converter 64a is twice the step cycle of the spread code depicted in FIG. 13.

Figure 15:
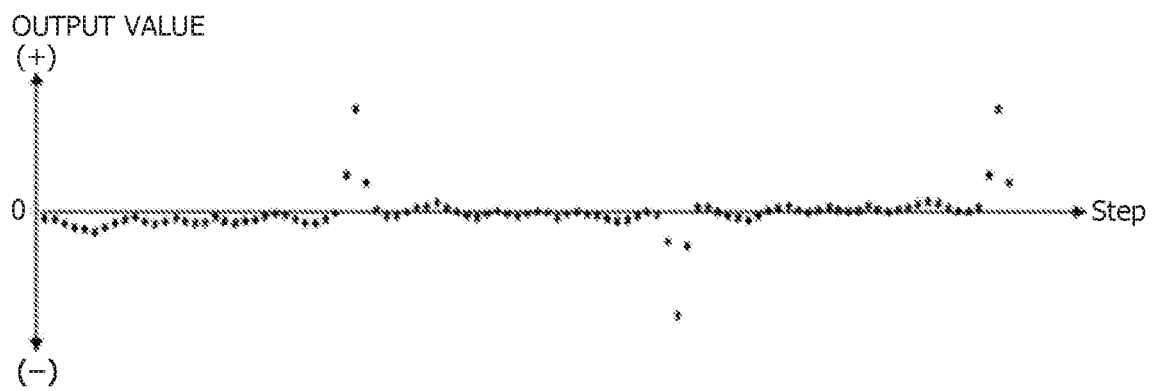
FIG. 15 is a diagram depicting the relation between each step and its output in FIG. 14.

FIG. 15 depicts the relation between each step (each rising edges of CLK) as depicted in FIG. 14 and its output. The controller 60, after receiving the trigger signal US_trg, activates the control signal En as depicted in Table 1, and sends the reset signal (Reset) to the matched filter circuit 64b. This results in the shift register (R0 to R31) being cleared, so that the output (Q0 to Q15) from the arithmetic unit becomes null. The present embodiment requires that the command information receiver 64 of the stylus 2 becomes active before the tablet transmits the command signal US_cmd. This is illustrated in FIG. 15 on the assumption that the first clock (CLK) that follows the reset signal (Reset) rises immediately after the tablet has started transmitting the command signal US_cmd (FIG. 13).

FIG. 15 depicts that the output (Q0 to Q15) from the matched filter circuit 64b shifts toward a large positive value at the 32-nd step and shifts toward a large negative value at the 64-th step, and shifts again toward a large positive value at the 96-th step. Thus, the controller 60 detects the command information Cmd transmitted from the tablet as (1, 0, 1).

Figure 4:
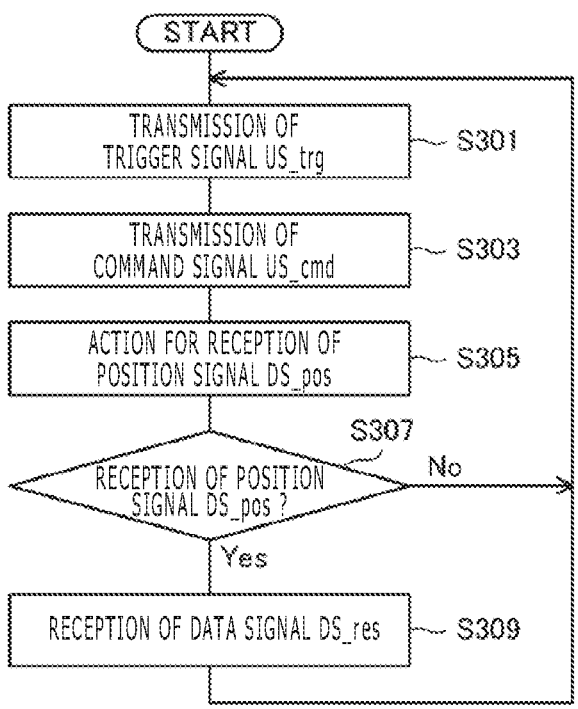
FIG. 4 is a flowchart depicting the processing in the tablet 3 according to the first embodiment of the present disclosure.
Figure 5:
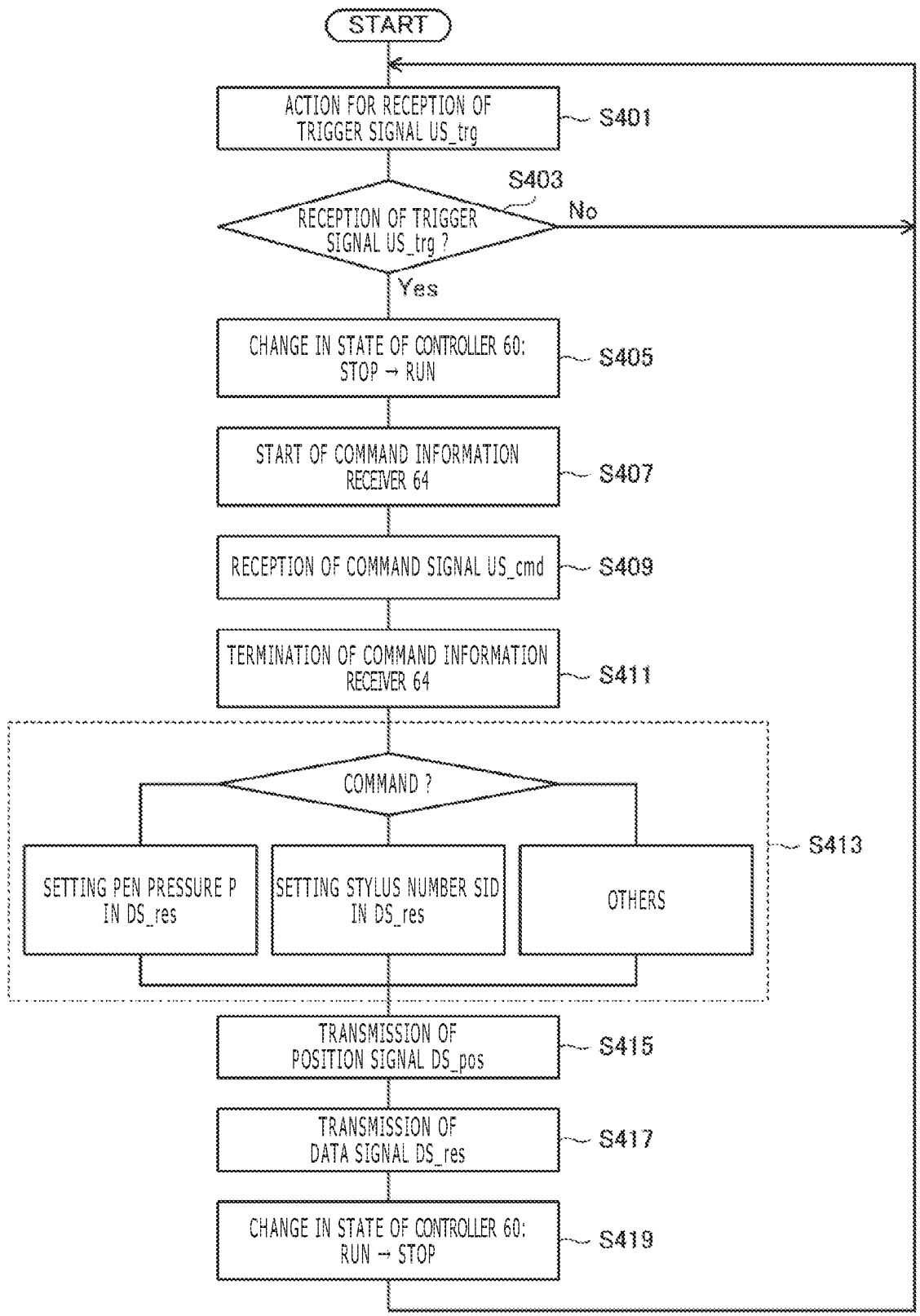
FIG. 5 is a flowchart depicting the processing in the stylus 2 according to the first embodiment of the present disclosure.
Figure 6:
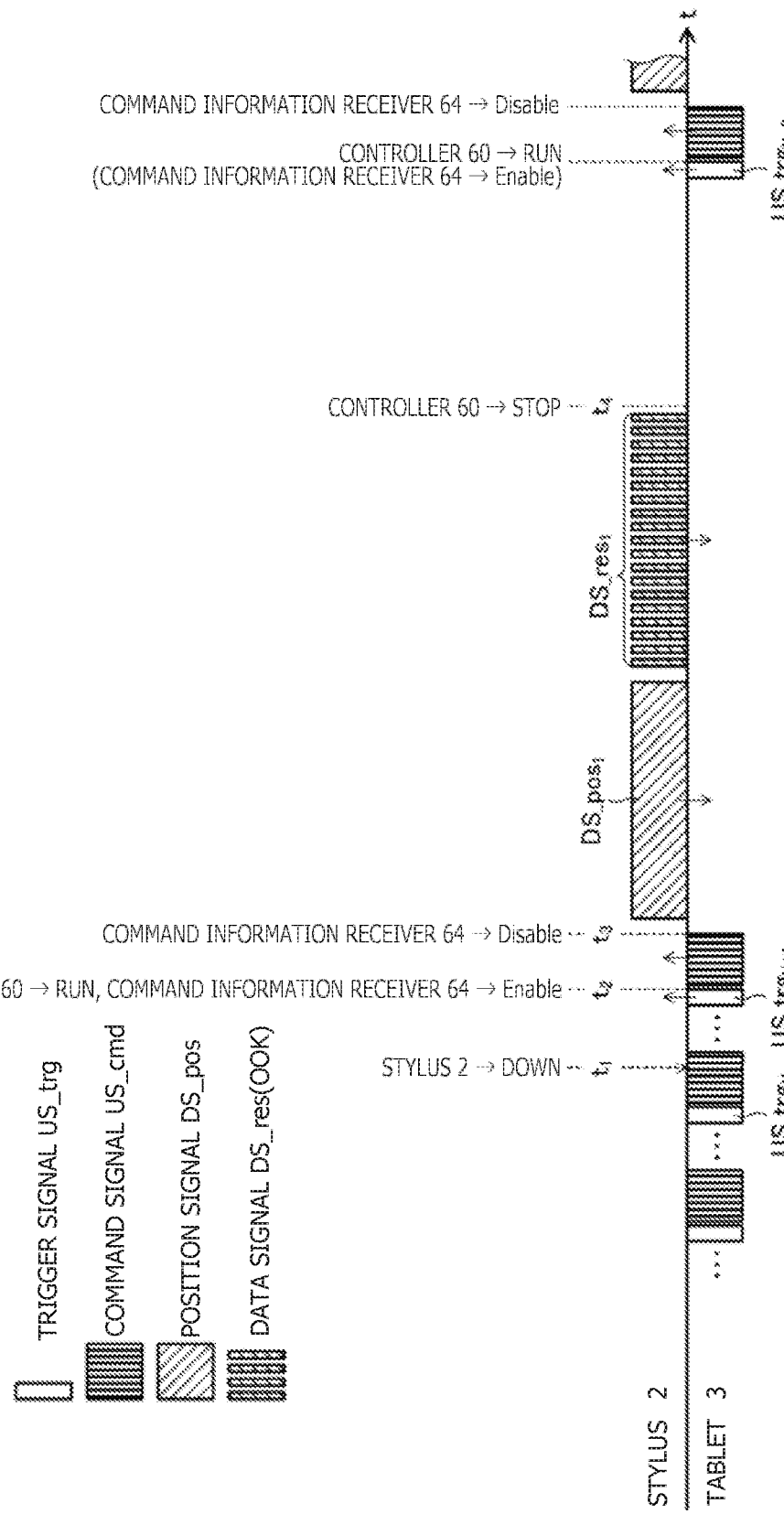
FIG. 6 is a diagram depicting the timing for signal transmission and reception between the stylus 2 and the tablet 3 according to the first embodiment of the present disclosure.

The foregoing is a description of the structure and operation of the stylus 2. The following is a general description of how the position detection device operates according to the present embodiment with reference to FIGS. 4 and 5 that depict process flows and FIG. 6 that depicts timing of signal transmission and reception. FIG. 4 is a flow diagram depicting how the tablet 3 performs processing according to the present embodiment. FIG. 5 is a flow diagram depicting how the stylus 2 performs processing according to the present embodiment. FIG. 6 is a diagram depicting the timing of signal transmission and reception between the stylus 2 and the tablet 3 according to the present embodiment.

As depicted in FIGS. 4 and 6, the tablet 3 transmits the trigger signal US_trg and the command signal US_cmd repeatedly and periodically (as noted from Steps S301 and S303 in FIG. 4). The foregoing signal transmission may be performed in a time-division manner so as to additionally detect the finger 4, though description of finger detection is omitted here. The following description is based on the assumption that the stylus 2 is placed on (DOWN) the sensor surface 3a of the tablet 3 (FIG. 1) at time t1 (which denotes the time between the time at which the N-th trigger signal US_trg N is transmitted and the time at which the (N+1)-th trigger signal US_trg N+1 is transmitted) depicted in FIG. 6.

The stylus 2 in its initial state repeats reception of the trigger signal US_trg (as noted from Steps S401 and S403 in FIG. 5). As soon as the stylus 2 approaches or contacts the sensor surface 3a of the tablet 3 at time t1, the stylus 2 receives the trigger signal US_trg N+1 transmitted from the tablet 3 thereafter. As soon as the stylus 2 receives the trigger signal US_trg N+1, the controller 60 switches from the STOP state (the low-speed operation mode described above) into the RUN state (the high-speed operation mode described above) (see Step S405 in FIG. 5 and time t2 in FIG. 6). This change occurs as the detected signal Det (depicted in FIG. 3) reaches the high level.

The controller 60, which has turned into the RUN state, activates the control signal En, thereby starting the command information receiver 64 (tuning into the Enable state) (see Step S407 in FIG. 5 and time t2 in FIG. 6). The command information receiver 64, which has been started in this manner, receives the trigger signal US_trg N+1 and the command signal US_cmd in succession from the tablet 3 (Step S409). Thereafter, the controller 60 inactivates the control signal En, thereby terminating (or turning into the Disable state) the command information receiver 64 (see Step S411 in FIG. 5 and the time t3 in FIG. 6).

Next, the controller 60 performs a process in response to the content of command information Cmd extracted from the command information receiver 64 that has received the command signal US_cmd (see Step S413 in FIG. 5). A typical example of the process will be explained below. Suppose that the command information Cmd is intended to acquire a value of pen pressure. Then, the controller 60 sets the latest value P of pen pressure (pen pressure information), which has been acquired from the pen pressure detecting sensor 23 depicted in FIG. 1, in the data signal DS_res. Also, when the command information Cmd is intended to cause the stylus 2 to acquire the unique stylus number SID (ID information), the controller 60 sets the stylus number SID, which has been stored in the memory unit (not depicted), in the data signal DS_res.

The controller 60 may perform, in response to the content of the command information Cmd, various processes in addition to those described above. For example, it may detect the slide lever position of a slide lever provided on the side of the stylus 2 and use the slide level position information as the command information Cmd. Alternatively, the controller 60 may, in response to the content of the command information Cmd, alter the transmission timing of the position signal DS_pos, or change the frequency of the position signal DS_pos or the data signal DS_res.

Next, the controller 60 transmits the position signal DSpos and the data signal DS_res sequentially (see Steps S415 and S417 in FIG. 5; see the position signal DS_pos1 and the data signal DS_res1 in FIG. 6). The controller 60, which has completed the transmission of the data signal DS_res, switches from the RUN state (the high-speed operation mode described above) into the STOP state (the low-speed operation mode described above) (see Step S419 in FIG. 5; see time t4 in FIG. 6). On the other hand, the tablet 3 transmits the command signal US_cmd and then receives the position signal DS_pos (see Step S305 in FIG. 4). If the tablet 3 successfully receives the position signal DS_pos (see Step S307 for affirmative judgment in FIG. 4), the tablet 3 subsequently receives the data signal DS_res (see Step S309 in FIG. 4). If the tablet 3 fails to receive the position signal DS_pos (see Step S307 for negative judgment in FIG. 4), it returns to the step of transmitting the trigger signal US_trg (see Step S301 in FIG. 4).

The foregoing operation completes the series of processes corresponding to the (N+1)-th trigger signal US_trg N+1. Thereafter, as depicted in FIG. 6, the tablet 3 transmits the (N+2)-th trigger signal US_trg N+2 and then repeats the same processes as described above. The tablet 3 may transmit the trigger signal US_trg either at a constant rate or at a variable rate. Moreover, the tablet 3 may be so adjusted as to transmit the trigger signal US_trg at a variable rate in accordance with whether or not it has received the position signal DS_pos or the data signal DS_res.

The tablet 3 receives the position signal DS_pos in the following way. When the stylus 2 is placed on the tablet 3 for the first time (DS_pos1), the tablet 3 performs signal reception while sequentially switching the X-electrodes and the Y-electrodes which are selected by the selecting circuit 41 and the selecting circuit 42 depicted in FIG. 2. The tablet 3 calculates the X-coordinate and Y-coordinate for the position pointed to by the stylus 2 from the electrode number of the electrode, which has given the highest signal level, and the distribution of signal levels around that electrode number.

Also, when the position pointed to by the stylus 2 is roughly known (after DS_pos2), the tablet 3, when receiving the position signal DS_pos, may need to receive signals from only several X-electrodes and Y-electrodes around the known position. Thus, the tablet 3 can calculate the X-coordinate and Y-coordinate of the position pointed to by the stylus 2 from the distribution of the signal levels.

As described above, the present embodiment offers an advantage that the stylus 2 does not receive the trigger signal US_trg when the stylus 2 is not on the tablet 3 and hence the stylus 2 does not need to transmit signals. This helps reduce battery power consumption in the stylus 2 as compared to the conventional active stylus.

Moreover, the stylus 2 can be configured to only transmit the information requested by the command signal US_cmd, which helps reduce the time required by the stylus 2 for its signal transmission.

According to the present embodiment, the stylus 2 includes the command information receiver 64, which receives the command signal US_cmd, and is capable of altering the content of the data signal DS_res in response to the content of the received command information Cmd. This configuration obviates the necessity for the stylus to keep transmitting the unique ID number, which does not need to be received more than once. As a result, the stylus can reduce the time required for tis signal transmission and hence reduce power consumption.

Moreover, according to the present embodiment, the stylus 2 includes the trigger signal detector 63, which detects the trigger signal US_trg separately from the command signal US_cmd, so that the command information receiver 64 is activated only when the trigger signal detector 63 detects the trigger signal US_trg. This configuration permits shortening the active time of the command information receiver 64, which entails large power consumption, and hence contributes to further power saving in the stylus.

In addition, according to the present embodiment, the stylus 2 keeps the controller 60 in the low-speed operation mode until the data signal DS_res is transmitted and then the trigger signal US_trg is received. This helps the controller 60 to reduce power consumption. Thus, the embodiment described above permits the stylus 2 to reduce power consumption even further, as compared with the conventional active stylus.

Furthermore, the stylus 2 according to the present embodiment is configured such that the transformer 62, in which the secondary coil is the coil of the LC resonance circuit 61a for signal transmission, plays a role of a band-pass filter. This permits the stylus 2 to operate with a less number of parts than the conventional stylus which needs a separate band-pass filter to receive the trigger signal US_trg.

The present embodiment employs the spectrum spread code as the command signal US_cmd to be transmitted by the tablet. This is not intended to limit the scope of the present disclosure. It will be possible, for example, to employ another modulating system which alters the frequency or phase of the signal to be transmitted by the command information Cmd. In such a case, the stylus 2 will need the command information receiver 64 to be modified in structure according to the modulating system. No matter what the modulating system may be, the signal detection involving decoding usually consumes a large amount of electric power, and the present embodiment offers the same technical advantage in this regard.

The second embodiment of the present disclosure will be described below. The tablet 3 and stylus 2 according to this embodiment are identical in structure with those depicted in FIGS. 1 to 3. The second embodiment differs from the first embodiment in the order of transmitting the position signal DS_pos and the command signal US_cmd. They are identical in other respects. The following description is focused mainly on the difference between the two embodiments.

Figure 7:
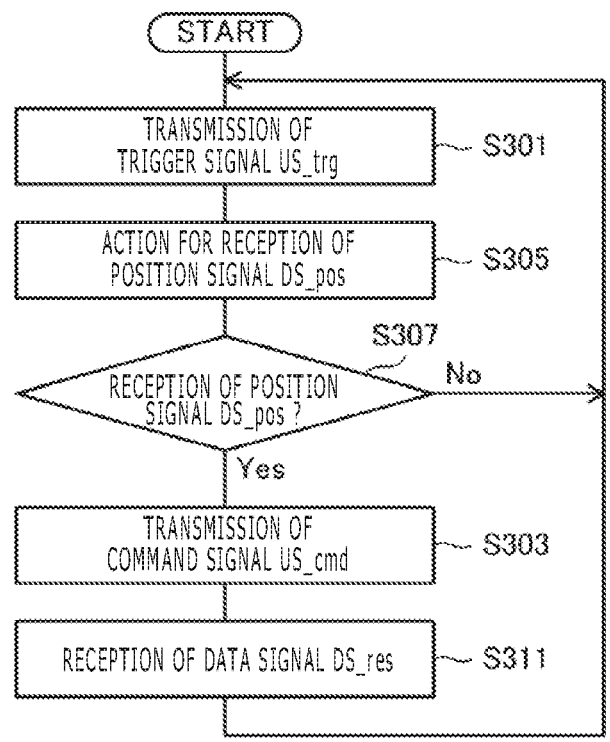
FIG. 7 is a flowchart depicting the processing in the tablet 3 according to a second embodiment of the present disclosure.
Figure 8:
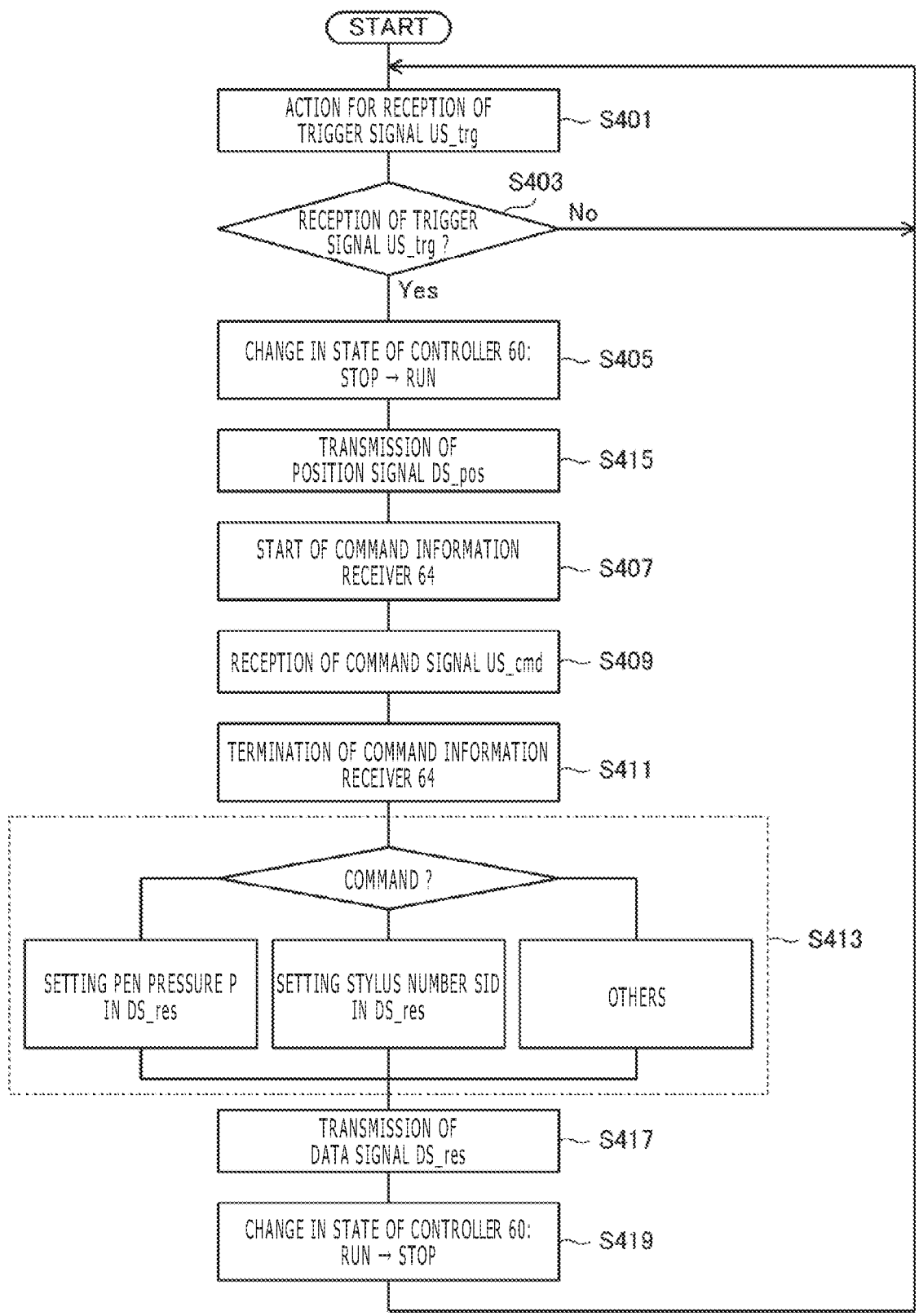
FIG. 8 is a flowchart depicting the processing in the stylus 2 according to the second embodiment of the present disclosure.
Figure 9:
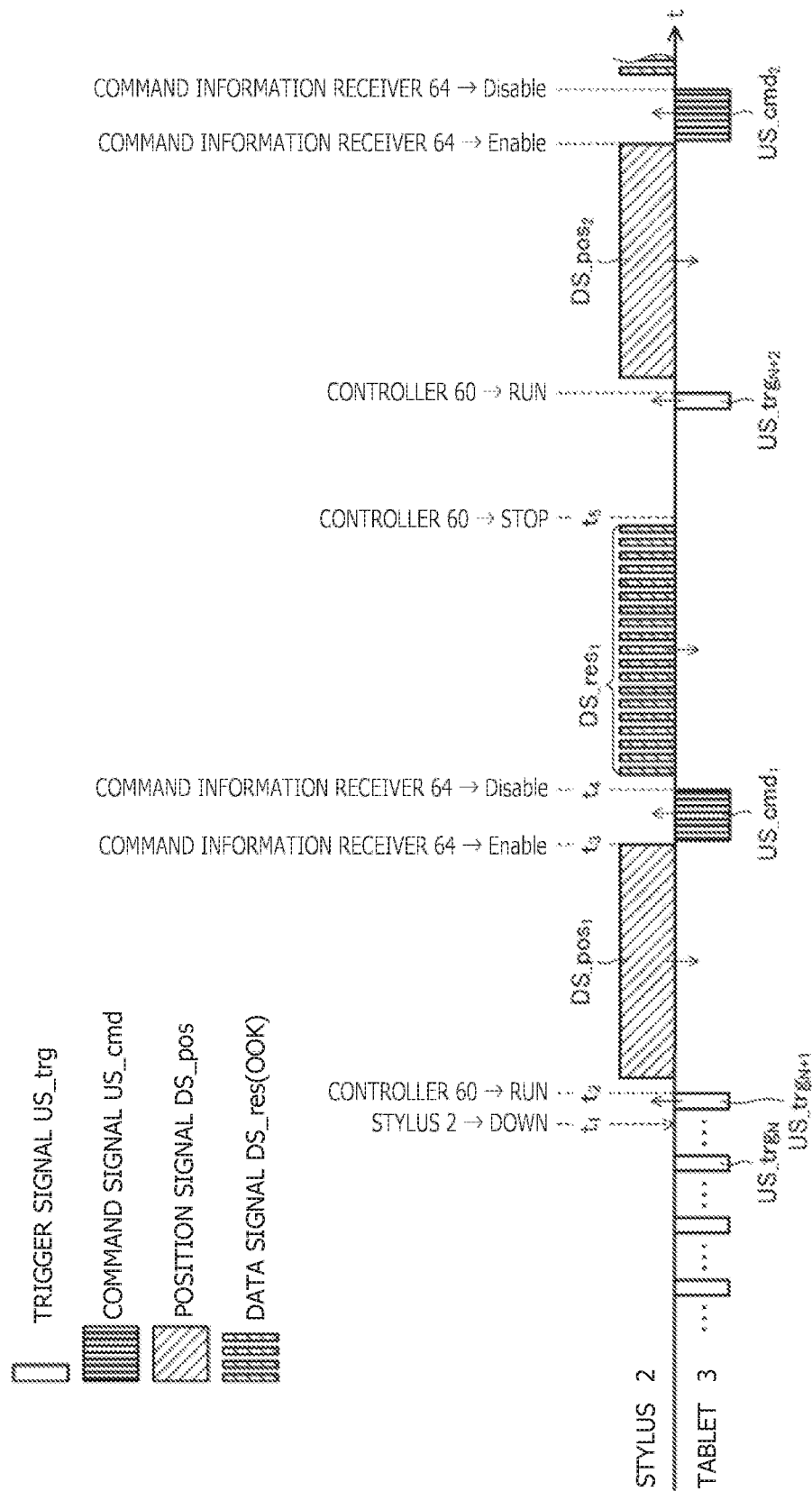
FIG. 9 is a diagram depicting the timing for signal transmission and reception between the stylus 2 and the tablet 3 according to the second embodiment of the present disclosure.

FIG. 7 is a flow diagram depicting a process by the tablet 3 according to the present embodiment. FIG. 8 is a flow diagram depicting a process by the stylus 2 according to the present embodiment. FIG. 9 is a diagram depicting timing for the signals to be transmitted and received between the stylus 2 and the tablet 3.

The tablet 3 according to the present embodiment has the control circuit 43 as depicted in FIG. 2. As depicted in FIG. 7, the control circuit 43 receives the position signal DS_pos from the stylus 2 (see Steps S305 and S307 in FIG. 7), thereby detecting the position of the stylus 2, and then transmits the command signal US_cmd (see Step S303 in FIG. 7). The command signal US_cmd is transmitted only when the position signal DSpos is received.

According to the present embodiment, the controller 60 in the stylus 2 controls the switches SW1 to SW3 and the control signal En as depicted in Table 2.

TABLE 2

| Timing | Corresponding mode for tablet 3 | SW1 | SW2 | SW3 | En | Action of stylus 2 |
|---|---|---|---|---|---|---|
| Initial state | Mode to detect position of finger 4 Mode to transmit trigger signal US_trg | on | on | off | Inactive | Reception of trigger signal US_trg |
| After reception of trigger signal US_trg | Mode to detect position of stylus 2 | on | off | off | Inactive | Transmission of position signal DS_pos |
| After transmission of position signal DS_pos | Mode to transmit command signal US_cmd | on | on/off | on | Active | Reception of command signal US_cmd |
| After reception of command signal US_cmd | Mode to receive data signal DS_res | on | off | off | Inactive | Transmission of data signal DS_res |

It is understood from comparison between Table 2 and Table 1 that the present embodiment differs from the first embodiment in that the transmission of the position signal DS_pos precedes the reception of the command signal US_cmd. This is apparent from the flow diagram depicted in FIG. 8. The stylus 2 according to the present embodiment is so constructed as to transmit the position signal DS_pos (see Step S415 in FIG. 8) and then starts the command information receiver 64 (see Step S407 in FIG. 8).

To realize the foregoing operation, the controller 60 according to the present embodiment receives the trigger signal US_trg (which brings the detected signal Det to the high level) and then turns off the switch SW2. The switch SW1 and the switch SW3 remain on and off, and the command information receiver 64 also remains inactive. Thus, the controller 60 transmits the position signal DS_pos in the same way as in the first embodiment.

As soon as the transmission of the position signal DS_pos is complete, the controller 60 starts control to receive the command signal US_cmd. That is, the controller 60 turns the switch SW1 off and turns the switch SW3 on and activates the control signal En, thereby activating the command information receiver 64. The switch SW2 may be left off or turned on. In this way, the command information receiver 64 receives the command signal US_cmd transmitted from the tablet 3, and the controller 60 stores the command information Cmd.

The following process takes place during transition from S307 to S303, although not depicted in FIG. 7. The tablet 3 detects the end of the position signal DS_pos and, after a certain length of time, starts the transmission of the command signal US_cmd. During said time (the certain length of time), the stylus 2 makes the command information receiver 64 active.

The controller 60, which has stored the command information Cmd, turns the switch SW1 on and turns the switches SW2 and SW3 off and suspends the command information receiver 64. Then, the controller 60 transmits the data signal DS_res in response to the command information Cmd in the same way as in the first embodiment.

According to the present embodiment, the tablet 3 transmits the trigger signal US_trg periodically and repeatedly as depicted in FIG. 9. And, at time t1, the stylus 2 placed on (DOWN) the sensor surface 3a of the tablet 3 receives the trigger signal US_trg N+1, which has been transmitted from the tablet 3, and turns the controller 60 into the RUN state (the high-speed operation mode described above) at time t2 in FIG. 9, and subsequently the controller transmits the position signal DS_pos (position signal DS_pos1 in FIG. 9). As soon as the transmission of the position signal DS_pos is complete, the controller starts the command information receiver 64 (turns into Enable state) (at time t3 in FIG. 9) to receive the command signal US_cmd1 transmitted from the tablet 3. At time t4 after signal reception, the stylus terminates the command information receiver 64 (turns into Disable state) and then transmits the data signal DS_res1 in the same way as depicted in FIG. 6. The controller 60, which has transmitted the data signal DS_res, is switched from the RUN state (the high-speed operation mode described above) into the STOP state (the low-speed operation mode described above) at time t5 depicted in FIG. 9.

According to the present embodiment, the foregoing operation completes the series of processes corresponding to the (N+1)-th trigger signal US_trg N+1. Thereafter, as depicted in FIG. 9, the tablet 3 transmits the (N+2)-th trigger signal US_trg N+2 and then repeats the same processes as described above. In the present embodiment also, the tablet 3 may transmit the trigger signal US_trg either at a constant rate or at a variable rate. Moreover, the tablet 3 may be so adjusted as to transmit the trigger signal US_trg at a variable rate in accordance with whether or not it has received the position signal DS_pos or the data signal DS_res.

As described above, the present embodiment, too, offers an advantage that the stylus 2 does not receive the trigger signal US_trg when the stylus 2 is not on the tablet 3 and hence the stylus 2 does not need to transmit signals. This helps reduce battery power consumption in the stylus 2 as compared to the conventional active stylus.

Moreover, the stylus 2 can be configured to only transmit the information requested by the command signal US_cmd, which helps reduce the time required by the stylus 2 for its signal transmission.

According to the present embodiment also, the stylus 2 includes the command information receiver 64, which receives the command signal US_cmd, and is capable of altering the content of the data signal DS_res in response to the content of the thus received command information Cmd. This configuration obviates the necessity for the stylus to keep transmitting the unique ID number, which does not need to be received more than once. As a result, the stylus can reduce time for its signal transmission and hence reduces power consumption.

Moreover, according to the present embodiment also, the stylus 2 includes the trigger signal detector 63, which detects the trigger signal US_trg separately from the command signal US_cmd, wherein when the trigger signal detector 63 detects the trigger signal US_rg, and after the position signal DS_pos is transmitted, the command information receiver 64 is started. This configuration permits shortening the active time of the command information receiver 64, which entails large power consumption, and hence contributes to further power saving in the stylus.

In addition, according to the present embodiment, the stylus 2 keeps the controller 60 in the low-speed operation mode until the data signal DS_res is transmitted and then the trigger signal US_trg is received. This helps the controller 60 to save power consumption. Thus, the embodiment described above permits the stylus 2 to reduce power consumption even further, as compared to the conventional active stylus.

Also, according to the present embodiment, the tablet 3 does not need to transmit the command signal US_cmd when the stylus 2 is not on the tablet 3. This leads to efficient use of time for detection of the finger 4, for example.

The present embodiment also employs the spectrum spread code as the command signal US_cmd to be transmitted by the tablet. This is not intended to limit the scope of the present embodiment. It will be possible to employ another modulating system as effectively as in the first embodiment.

The third embodiment of the present disclosure will be described below. The stylus 2 according to this embodiment differs from that in the first embodiment in that the data signal DS_res is composed of BPSK-modulated signals. This difference makes the stylus 2 to differ in structure but, except for this difference, the stylus 2 according to the third embodiment is identical to the stylus 2 according to the second embodiment. The following description is focused mainly on the difference between the second embodiment and the third embodiment.

Figure 10:
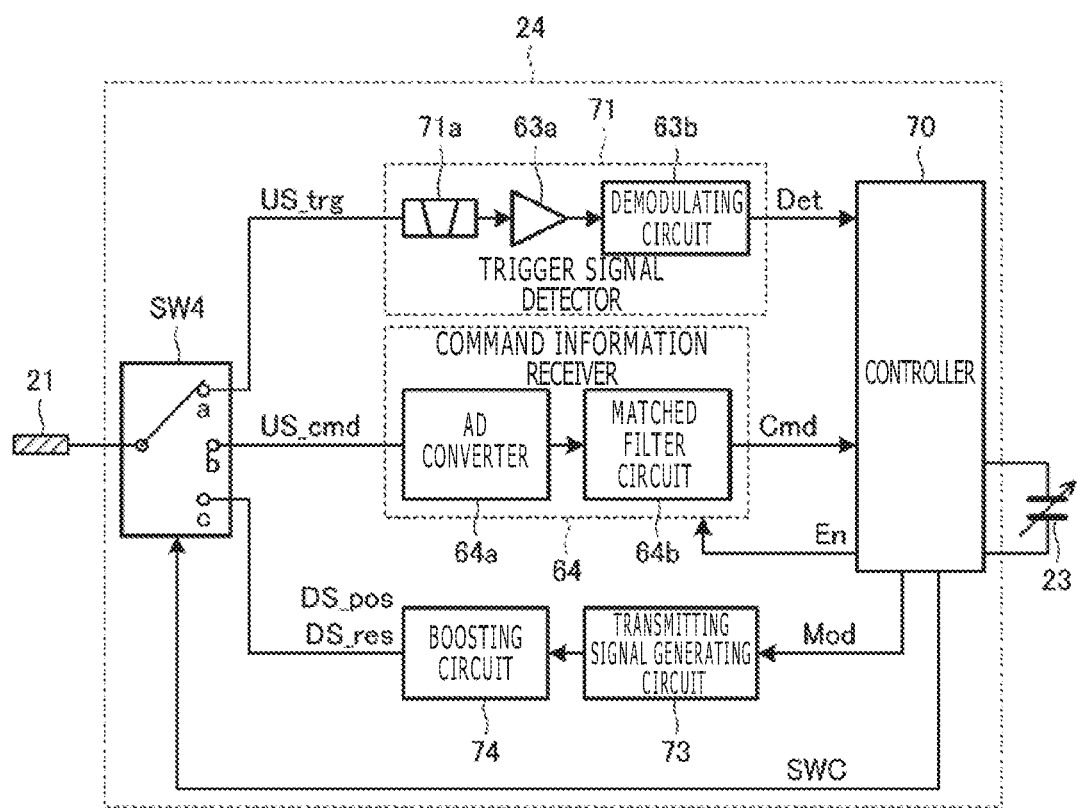
FIG. 10 is a diagram depicting the internal structure of the stylus 2 according to a third embodiment of the present disclosure.
Figure 11:
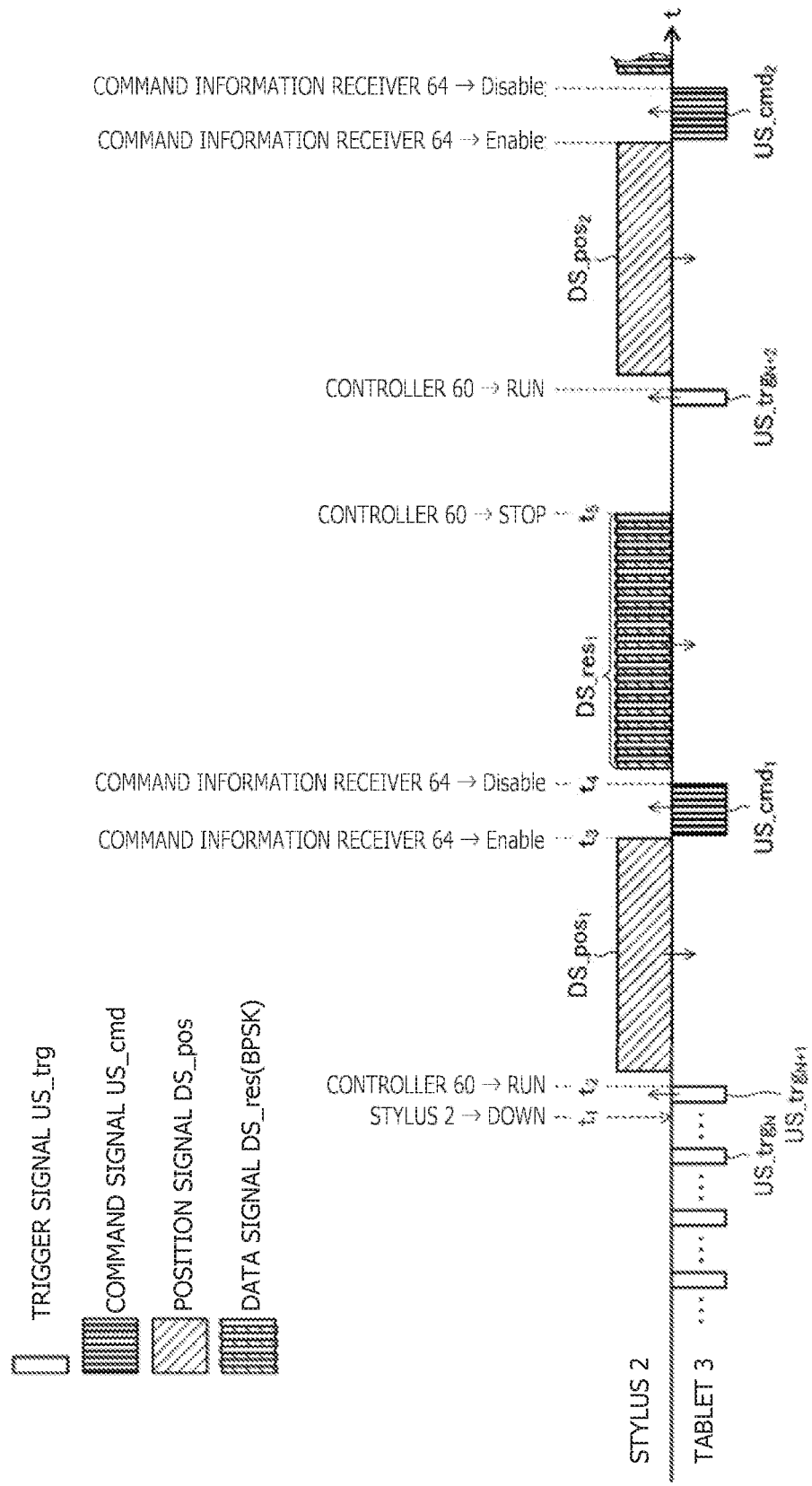
FIG. 11 is a diagram depicting the timing for signal transmission and reception between the stylus 2 and the tablet 3 according to the third embodiment of the present disclosure.

FIG. 10 is a diagram depicting the internal structure of the stylus 2 according to the third embodiment. FIG. 11 is a timing chart for the signals transmitted and received between the stylus 2 and the tablet 3 according to the third embodiment.

In FIG. 10, corresponding components are given identical symbols as those used in FIG. 3. The third embodiment (depicted in FIG. 10) is identical with the first embodiment (depicted in FIG. 3) in the structure of the electrode 21, the command information receiver 64, the AD converter 64a, the matched filter circuit 64b, the amplifying circuit 63a, the demodulating circuit 63b, and the pen pressure detecting sensor 23.

The switch SW4 is intended to select one terminal from three terminals a, b, and c and connects the selected terminal to the electrode 21. The terminal a is connected to the trigger signal detector 71; the terminal b is connected to the command information receiver 64, and the terminal c is connected to the boosting circuit 74 (to be described later). The switch SW4 has its state controlled by the control signal SWC supplied from the controller 70.

The transmitting signal generating circuit 73 generates signals in response to the demodulating signal Mod from the controller 70, wherein the signals serve as the bases of the position signal DS_pos and data signal DS_res. The boosting circuit 74 boosts the signal generated by the transmitting signal generating circuit 73 up to a certain amplitude, thereby producing the position signal DS_pos and data signal DS_res.

The position signal DS_pos employed in the third embodiment is identical with that employed in the second embodiment. On the other hand, the data signal DS_res employed in the third embodiment differs from that in the second embodiment in the method of demodulation. In the third embodiment, the data signal DS_res may be demodulated in various ways. For example, BPSK (Binary Phase Shift Keying) is a preferred method of demodulation. The following description assumes that the data signal DS_res is demodulated by the BPSK method. Thus, the transmitting signal generating circuit 73 demodulates the modulating signal Mod by the BPSK method, thereby generating the data signal DS_res.

The trigger signal detector 71 is composed of the trigger signal detector 63 and the band-pass filter 71a (filter circuit) that passes certain frequencies around the defined single frequency, wherein the band-pass filter 71a is added to the preceding stage of the trigger signal detector 63 (preceding to the amplifying circuit 63a). In other words, the stylus 2 according to the third embodiment does not contain the LC resonance circuit 61a (in FIG. 3) and, consequently, it cannot limit the band by the transformer 62, unlike the first embodiment. To address this drawback in the third embodiment, the signals induced to the electrode 21 are cleared of signal components having frequencies outside the frequency band of the trigger signal US_trg by using the band-pass filter 71a. The amplifying circuit 63a and the demodulating circuit 63b perform processing in the same way as in the first embodiment.

The controller 70 according to the third embodiment controls the switch SW4 and command information receiver 64 as depicted in Table 3.

TABLE 3

| Timing | Corresponding mode for tablet 3 | State of SW4 | En | Action of stylus 2 |
| --- | --- | --- | --- | --- |
| Initial state | Mode to detect position of finger 4 Mode to transmit trigger signal US_trg | Selects terminal a | Inactive | Reception of trigger signal US_trg |
| After reception of trigger signal US_trg | Mode to detect position of stylus 2 | Selects terminal c | Inactive | Transmission of position signal DS_pos |
| After transmission of position signal DS_pos | Mode to transmit command signal US_cmd | Selects terminal b | Active | Reception of command signal US_cmd |
| After reception of command signal US_cmd | Mode to receive data signal DS_res | Selects terminal c | Inactive | Transmission of data signal DS_res |

It is understood from Table 3 that the controller 70 in its initial state causes the switch SW4 to select the terminal a and the command information receiver 64 to be suspended. The mode of the controller 70 in its initial state is the low-speed operation mode as described above in the same way as in the first embodiment. In this way, the electrode 21 is connected to the trigger signal detector 71, and the trigger signal US_trg is received as depicted in Table 3. In addition, the command information receiver 64 remains idle, so that the stylus 2 reduces power consumption.

After the trigger signal US_trg has been received (or after the detected signal Det from the trigger signal detector 71 has taken on the high level), the controller 70 causes the switch SW4 to select the terminal c and turns itself into the high-speed operation mode described above. Furthermore, the controller 70 generates the modulating signal Mod, which permits the transmitting signal generating circuit 73 and the boosting circuit 74 to generate the position signal DS_pos, which is a signal of a single frequency. The generated position signal DS_pos is then supplied to the transmitting signal generating circuit 73. As a result, the electrode 21 sends out the position signal DS_pos to be received by the tablet 3 in the same way as in the second embodiment.

After having transmitted the position signal DS_pos, the controller 70 causes the switch SW4 to select the terminal b and activates the control signal En, thereby activating the command information receiver 64. As a result, the command information receiver 64 receives the command signal US_cmd, and the controller 70 extracts the command information Cmd from the command signal US_cmd received by the command information receiver 64 and stores the extracted command information Cmd.

After having received the command signal US_cmd, the controller 70 causes the switch SW4 to select the terminal c and inactivates the control signal En, thereby causing the command information receiver 64 to be suspended. Then the controller 70 generates the modulating signal Mod and supplies it to the transmitting signal generating circuit 73. The modulating signal Mod causes the transmitting signal generating circuit 73 to generate the data signal DS_res in response to the command information Cmd which has been stored. As a result, the electrode 21 transmits the BPSK-demodulated data signal DS_res, which is received by the tablet 3 as in the case of the second embodiment.

The tablet 3 in the third embodiment may be constructed such that the demodulating circuit 49 and the AD converter 50, which are depicted in FIG. 2, are replaced by the BPSK-demodulating circuit.

In a preferred form, the third embodiment causes the stylus 2 to transmit the data signal DS_res in synchronization with the reception of signal by the command information receiver 64. The matched filter circuit 64b produces its output, which varies with time as depicted in FIG. 15. The output values Q0 to Q15 fluctuate between a certain positive level and a negative level, and some of them exceed those levels at the 32nd, 64th, and 96th steps (depicted in FIG. 15). These steps coincide with the timing at which each bit of the command signal US_cmd has been transmitted from the tablet 3 as depicted in FIG. 13. This means that if the stylus 2 transmits the data signal DS_res in synchronization with the command signal US_cmd, then the tablet 3 can reliably demodulate the BPSK signal.

According to the third embodiment, the data signal DS_res may be a BPSK-modulated signal. Except for this point, the third embodiment is identical with the second embodiment and hence it also produces the effect of reducing battery power consumption in the stylus 2.

The third embodiment is identical with the second embodiment in the order of transmission of the position signal DS_pos and the command signal US_cmd. However, the third embodiment may be modified such that these signals are transmitted in the same order as in the first embodiment.

The foregoing is a description of the preferred embodiments of the present disclosure. However, they are not intended to limit the scope of the present disclosure. Needless to say, the present disclosure will be variously embodied within the scope of the disclosure.

For example, the second and third embodiments described above have the stylus 2 constructed such that the position signal DS_pos is transmitted first and then the data signal DS_res is transmitted, essentially requiring use of the position signal DS_pos. The first embodiment, however, may function satisfactorily even in the case where the stylus 2 does not transmit the position signal DS_pos. In this case, the tablet 3 acquires the position information of the stylus from the data signal DS_res. This is illustrated in FIG. 12.

Figure 12:
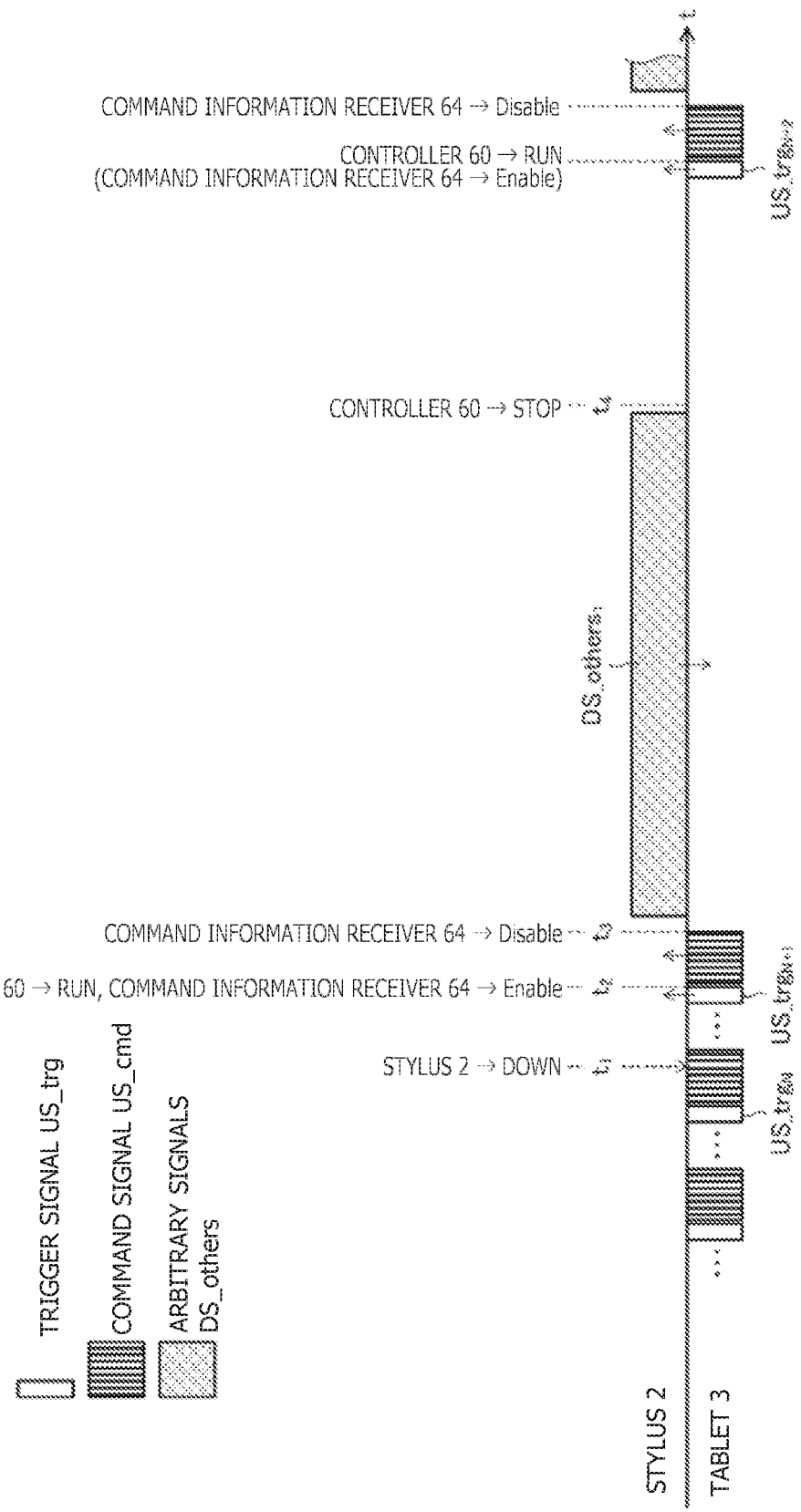
FIG. 12 is a diagram depicting the timing for signal transmission and reception between the stylus 2 and the tablet 3 according to a modification of the first embodiment of the present disclosure.

FIG. 12 is a diagram depicting the timing for signal reception and transmission between the stylus 2 and the tablet 3 in a modification of the first embodiment. It depicts that the stylus 2 according to the modified embodiment transmits the signal "DS_others" instead of the position signal DS_pos and the data signal DS_res. This modification is possible in the first embodiment, in which the tablet 3 transmits the command signal US_cmd before receiving the position signal DS_pos.

Figure 17:
FIG. 17 is a diagram depicting an example of the internal structure of the stylus 2 according to a modification of the third embodiment.
Figure 18:
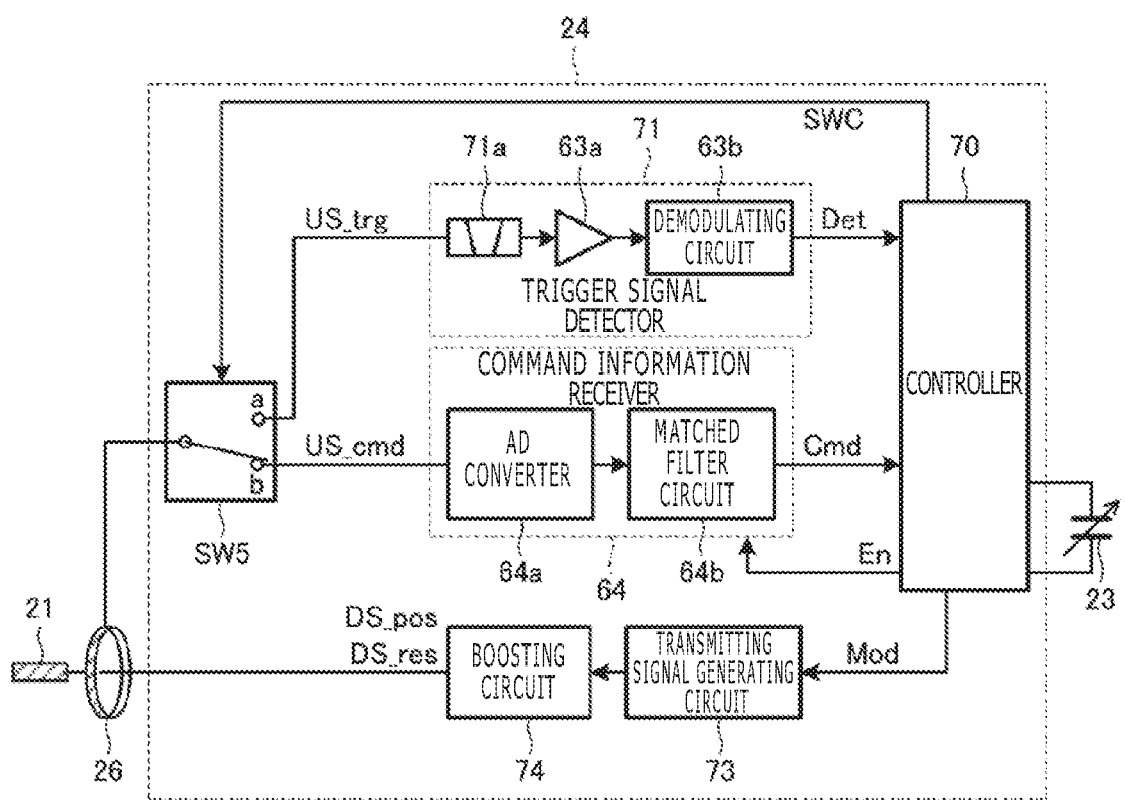
FIG. 18 is a diagram depicting an example of the internal structure of the stylus 2 according to a modification of the third embodiment.

A modification of the third embodiment employs the stylus 2 which has the internal structure and the internal configuration as depicted in FIGS. 17 and 18. Although the stylus 2 according to the third embodiment is provided with the electrode 21 which transmits the signals (DS_pos and DS_res) and receives the signals (US_trg and US_cmd), the stylus 2 according to the modified embodiment includes not only the electrode 21 at the tip of the core 20 which transmits the signals (DS_pos and DS_res) but also the additional electrode 26 which receives the signals (US_trg and US_cmd). The additional electrode 26 is a ring-shaped electrode attached close to the tip end of the body of the stylus 2, as depicted in FIG. 17.

The stylus 2 according to the modified embodiment is configured as depicted in FIG. 18, and operates in the same way as with the third embodiment (depicted in FIG. 10 and Table 3). In other words, the controller 70 performs control in such a way that when the SW4 selects the terminal a (as depicted in Table 3), the SW5 selects the terminal a (as depicted in FIG. 18), and the controller 70 performs control in such a way that when the SW4 selects the terminal b (as depicted in Table 3), the SW5 selects the terminal b (as depicted in FIG. 18). Also, the stylus 2 according to the modified embodiment operates in the same way as the third embodiment if it is configured in such a way that when the SW4 selects the terminal c (as depicted in Table 3), the SW5 selects the terminal b and the control signal En is left inactive (as depicted in FIG. 18). This configuration avoids activating the command information receiver 64 based on a determination that the electrode 26 is connected to the command information receiver 64. It is also possible to configure the embodiment such that the SW5 does not selects either the terminal a or the terminal b.

The stylus (depicted in FIG. 18) according to the modified embodiment is configured such that the electrode for signal transmission is connected directly to the boosting circuit 74. This permits decreasing the capacity of the output terminal of the boosting circuit 74, thereby reducing power consumption in the boosting circuit 74.

Each of the foregoing embodiments is designed such that the stylus 2 has a battery for power supply. However, the battery may be replaced by a super capacitor combined with a charging circuit.

Moreover, each of the foregoing embodiments is designed such that the pen pressure is converted into digital information, which is subsequently transmitted after OOK demodulation or BPSK demodulation. This configuration may be modified such that the frequency of position signal DS_pos is altered in accordance with the pen pressure, for example.

DESCRIPTION OF REFERENCE SYMBOLS

1 Position detection device
2 Stylus
3 Tablet
3a Sensor surface of tablet 3
4 Finger
20 Core
20a Tip of core 20
21, 26 Electrode
23 Pen pressure detecting sensor
24 Circuit board
25 Battery
30 Sensor
30X, 30Y Linear electrode
31 Sensor controller
41 X-selecting circuit
42 Y-selecting circuit
43 Control circuit
43a Trigger signal transmitter
43b Command signal transmitter
44, 45 Switch
46, 63a Amplifying circuit
47 Gain control circuit
48, 71a Band-pass filter
49, 63b Demodulating circuit
50, 64a AD converter
51 MCU
60, 70 Controller
61 Oscillating circuit
61a LC resonance circuit
62 Transformer
63, 71 Trigger signal detector
64 Command information receiver
64b Matched filter circuit
73 Transmitting signal generating circuit
74 Boosting circuit
SW1 to SW5 Switch

The invention claimed is:

1. A position detection device configured to obtain a position pointed to by a position indicator on a tablet through capacitive coupling between the position indicator and the tablet, the position detection device comprising:
   the tablet, which includes a sensor configured to transmit, through the capacitive coupling to the position indicator, a first control signal and a second control signal for controlling the position indicator, wherein the first control signal and the second control signal are different from each other, and the first control signal causes the position indicator to perform a first control operation and the second control signal causes the position indicator to perform a second control operation different from the first control operation; and
   the position indicator, which includes a power source and an electrode, wherein the electrode is configured to transmit, through the capacitive coupling, at least a position-indicating signal to the sensor of the tablet and to receive, through the capacitive coupling, the first control signal and the second control signal transmitted from the sensor of the tablet.

2. The position detection device according to claim 1, wherein:
   the first control signal is a non-modulated signal; and
   the second control signal is a modulated signal.

3. The position detection device according to claim 1, wherein
   the second control signal is a signal obtained by spreading a defined binary data with a spread code.

4. The position detection device according to claim 1, wherein
   the second control signal is a signal obtained by frequency-modulating a carrier wave with a defined binary data.

5. The position detection device according to claim 1, wherein:
   the position indicator is operable in a first operation mode to only receive the first control signal and in a second operation mode to transmit at least the position-indicating signal and receive the second control signal repeatedly, and in response to reception of the first control signal in the first operation mode, a transition occurs from the first operation mode to the second operation mode.

6. The position detection device according to claim 1, wherein the tablet, in operation, transmits the second control signal subsequent to a transmission of the first control signal.

7. The position detection device according to claim 1, wherein:

the position indicator, in operation, receives the first control signal and thereafter transmits the position-indicating signal; and the tablet, in operation, receives the position-indicating signal and thereafter transmits the second control signal.

8. The position detection device according to claim 1, wherein the position indicator includes at least one of unique ID information and a pen pressure detection circuit and, in operation, transmits a data signal modulated according to the unique ID information or pen pressure information detected by the pen pressure detection circuit.

9. The position detection device according to claim 8, wherein the position indicator, in operation, selects the unique ID information, or the pen pressure information, or other information in response to the received second control signal and transmits the data signal modulated according to the selected information.

10. The position detection device according to claim 8, wherein the data signal to be transmitted by the position indicator is an On/Off Key (OOK)-modulated signal.

11. The position detection device according to claim 8, wherein the data signal to be transmitted by the position indicator is a Binary Phase Shift Keying (BPSK)-modulated signal.

12. The position detection device according to claim 1, wherein, the tablet includes a first control signal transmitter and a second control signal transmitter, which, in operation, respectively transmit the first control signal and the second control signal, via the sensor through the capacitive coupling to the position indicator, and the position indicator includes a position-indicating signal transmitter, which, in operation, transmits, via the electrode through the capacitive coupling, at least the position-indicating signal to the sensor of the tablet, a first control signal receiver, which, in operation, receives, via the electrode through the capacitive coupling, the first control signal transmitted from the first control signal transmitter, and a second control signal receiver, which, in operation, receives, via the electrode through the capacitive coupling, the second control signal transmitted from the second control signal transmitter.

13. The position detection device according to claim 12, wherein the first control signal receiver of the position indicator includes a filter circuit that, in operation, passes certain frequencies around a defined frequency.

14. A position indicator for indicating a position on a tablet through capacitive coupling between the position indictor and the tablet, the position indicator comprising:

a power source; and an electrode configured to transmit, through the capacitive coupling, at least a position-indicating signal to a sensor of the tablet, to receive, through the capacitive coupling, a first control signal transmitted from the sensor of the tablet, and to receive, through the capacitive coupling, a second control signal, which is different from the first control signal and which is transmitted from the sensor of the tablet, wherein the first control signal causes the position indicator to perform a first control operation and the second control signal causes the position indicator to perform a second control operation different from the first control operation.

15. The position indicator according to claim 14, wherein:

the first control signal is a non-modulated signal; and the second control signal is a modulated signal.

16. The position indicator according to claim 14, which is operable in a first operation mode to only receive the first control signal and in a second operation mode to transmit at least the position-indicating signal and receive the second control signal repeatedly; wherein in response to reception of the first control signal in the first operation mode, a transition occurs from the first operation mode to the second operation mode.

17. The position indicator according to claim 14, which includes at least one of unique ID information and a pen pressure detection circuit and which, in operation, transmits a data signal modulated according to the unique ID information or pen pressure information detected by the pen pressure detection circuit.

18. The position indicator according to claim 17, which, in operation, selects the unique ID information, or the pen pressure information, or other information in response to the received second control signal and transmits the data signal modulated according to the selected information.

19. The position indicator according to claim 17, wherein the data signal is an On/Off Key (OOK)-modulated signal.

20. The position indicator according to claim 17, wherein the data signal is a Binary Phase Shift Keying (BPSK)-modulated signal.

21. The position indicator according to claim 14, comprising:

a position-indicating signal transmitter, which, in operation, transmits, via the electrode through the capacitive coupling, at least the position-indicating signal to the sensor of the tablet;

a first control signal receiver, which, in operation, receives, via the electrode through the capacitive coupling, the first control signal transmitted from the sensor of the tablet; and a second control signal receiver, which, in operation, receives, via the electrode through the capacitive coupling, the second control signal transmitted from the sensor of the tablet.

22. The position indicator according to claim 21, wherein the first control signal receiver includes a filter circuit that, in operation, passes certain frequencies around a defined frequency.

23. The position indicator according to claim 14, wherein the second control signal is a signal obtained by spreading a defined binary data with a spread code.

24. The position indicator according to claim 14, wherein the second control signal is a signal obtained by frequency-modulating a carrier wave with a defined binary data.

\* \* \* \* \*